United States Patent
Brown et al.

(10) Patent No.: US 9,523,852 B1
(45) Date of Patent: Dec. 20, 2016

(54) MICRO COLLIMATOR SYSTEM AND METHOD FOR A HEAD UP DISPLAY (HUD)

(71) Applicants: Robert D. Brown, Lake Oswego, OR (US); Eric P. Stratton, Portland, OR (US); Charles W. Micka, Vista, CA (US)

(72) Inventors: Robert D. Brown, Lake Oswego, OR (US); Eric P. Stratton, Portland, OR (US); Charles W. Micka, Vista, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 14/814,020

(22) Filed: Jul. 30, 2015

(51) Int. Cl.
| | |
|---|---|
| *G02B 6/00* | (2006.01) |
| *G02B 27/01* | (2006.01) |
| *G02B 17/08* | (2006.01) |
| *G02B 27/28* | (2006.01) |
| *G02B 27/30* | (2006.01) |
| *G02B 27/42* | (2006.01) |
| *G02B 27/00* | (2006.01) |

(52) U.S. Cl.
CPC ....... *G02B 27/0101* (2013.01); *G02B 17/0884* (2013.01); *G02B 27/0081* (2013.01); *G02B 27/283* (2013.01); *G02B 27/30* (2013.01); *G02B 27/4211* (2013.01); *G02B 2027/011* (2013.01); *G02B 2027/0123* (2013.01); *G02B 2027/0178* (2013.01)

(58) Field of Classification Search
CPC .................................................. G02B 17/0884
See application file for complete search history.

(56) References Cited

U.S. PATENT DOCUMENTS

| | | |
|---|---|---|
| 2,141,884 A | 12/1938 | Sonnefeld |
| 3,620,601 A | 11/1971 | Waghorn |
| 3,851,303 A | 11/1974 | Muller |
| 3,885,095 A | 5/1975 | Wolfson et al. |
| 3,940,204 A | 2/1976 | Withrington |
| 4,082,432 A | 4/1978 | Kirschner |
| 4,099,841 A | 7/1978 | Ellis |

(Continued)

FOREIGN PATENT DOCUMENTS

| | | |
|---|---|---|
| CN | 101881936 A | 11/2010 |
| DE | 10 2006 03 785 | 7/2007 |

(Continued)

OTHER PUBLICATIONS

Non-Final Office Action on U.S. Appl. No. 14/152,756, mail date Aug. 25, 2015, 39 pages.

(Continued)

*Primary Examiner* — Rhonda Peace
(74) *Attorney, Agent, or Firm* — Donna P. Suchy; Daniel M. Barbieri

(57) ABSTRACT

A head up display can use a catadioptric collimating system. The head up display includes an image source. The head up display also includes a collimating mirror, and a polarizing beam splitter. The light from the image source enters the beam splitter and is reflected toward the collimating mirror. The light striking the collimating mirror is reflected through the beam splitter toward a combiner. A field lens can include a diffractive surface. A corrector lens can be disposed after the beam splitter.

20 Claims, 9 Drawing Sheets

(56) References Cited

U.S. PATENT DOCUMENTS

| | | |
|---|---|---|
| 4,178,074 A | 12/1979 | Heller |
| 4,218,111 A | 8/1980 | Withrington et al. |
| 4,232,943 A | 11/1980 | Rogers |
| 4,309,070 A | 1/1982 | St. Leger Searle |
| 4,647,967 A | 3/1987 | Kirschner et al. |
| 4,711,512 A | 12/1987 | Upatnieks |
| 4,714,320 A | 12/1987 | Banbury |
| 4,743,083 A | 5/1988 | Schimpe |
| 4,749,256 A | 6/1988 | Bell et al. |
| 4,775,218 A | 10/1988 | Wood et al. |
| 4,854,688 A | 8/1989 | Hayford et al. |
| 4,928,301 A | 5/1990 | Smoot |
| 4,946,245 A | 8/1990 | Chamberlin et al. |
| 5,007,711 A | 4/1991 | Wood et al. |
| 5,035,734 A | 7/1991 | Honkanen et al. |
| 5,076,664 A | 12/1991 | Migozzi |
| 5,079,416 A | 1/1992 | Filipovich |
| 5,117,285 A | 5/1992 | Nelson et al. |
| 5,124,821 A | 6/1992 | Antier et al. |
| 5,148,302 A | 9/1992 | Nagano et al. |
| 5,151,958 A | 9/1992 | Honkanen |
| 5,153,751 A | 10/1992 | Ishikawa et al. |
| 5,159,445 A | 10/1992 | Gitlin et al. |
| 5,160,523 A | 11/1992 | Honkanen et al. |
| 5,183,545 A | 2/1993 | Branca et al. |
| 5,187,597 A | 2/1993 | Kato et al. |
| 5,210,624 A | 5/1993 | Matsumoto et al. |
| 5,218,360 A | 6/1993 | Goetz et al. |
| 5,243,413 A | 9/1993 | Gitlin et al. |
| 5,289,315 A | 2/1994 | Makita et al. |
| 5,295,208 A | 3/1994 | Caulfield et al. |
| 5,303,085 A | 4/1994 | Rallison |
| 5,317,405 A | 5/1994 | Kuriki et al. |
| 5,341,230 A | 8/1994 | Smith |
| 5,351,151 A | 9/1994 | Levy |
| 5,359,362 A | 10/1994 | Lewis et al. |
| 5,363,220 A | 11/1994 | Kuwayama et al. |
| 5,369,511 A | 11/1994 | Amos |
| 5,400,069 A | 3/1995 | Braun et al. |
| 5,408,346 A | 4/1995 | Trissel et al. |
| 5,418,584 A | 5/1995 | Larson |
| 5,438,357 A | 8/1995 | McNelley |
| 5,455,693 A | 10/1995 | Wreede et al. |
| 5,471,326 A | 11/1995 | Hall et al. |
| 5,473,222 A | 12/1995 | Thoeny et al. |
| 5,496,621 A | 3/1996 | Makita et al. |
| 5,500,671 A | 3/1996 | Andersson et al. |
| 5,510,913 A | 4/1996 | Hashimoto et al. |
| 5,515,184 A | 5/1996 | Caulfield et al. |
| 5,524,272 A | 6/1996 | Podowski et al. |
| 5,532,736 A | 7/1996 | Kuriki et al. |
| 5,537,232 A | 7/1996 | Biles |
| 5,572,248 A | 11/1996 | Allen et al. |
| 5,579,026 A | 11/1996 | Tabata |
| 5,604,611 A | 2/1997 | Saburi et al. |
| 5,606,433 A | 2/1997 | Yin et al. |
| 5,612,733 A | 3/1997 | Flohr |
| 5,612,734 A | 3/1997 | Nelson et al. |
| 5,619,254 A | 4/1997 | McNelley |
| 5,629,259 A | 5/1997 | Akada et al. |
| 5,631,107 A | 5/1997 | Tarumi et al. |
| 5,633,100 A | 5/1997 | Mickish et al. |
| 5,646,785 A | 7/1997 | Gilboa et al. |
| 5,648,857 A | 7/1997 | Ando et al. |
| 5,661,577 A | 8/1997 | Jenkins et al. |
| 5,661,603 A | 8/1997 | Hanano et al. |
| 5,665,494 A | 9/1997 | Kawabata et al. |
| 5,668,907 A | 9/1997 | Veligdan |
| 5,682,255 A | 10/1997 | Friesem et al. |
| 5,694,230 A | 12/1997 | Welch |
| 5,701,132 A | 12/1997 | Kollin et al. |
| 5,706,108 A | 1/1998 | Ando et al. |
| 5,707,925 A | 1/1998 | Akada et al. |
| 5,724,189 A | 3/1998 | Ferrante |
| 5,726,782 A | 3/1998 | Kato et al. |
| 5,727,098 A | 3/1998 | Jacobson |
| 5,729,242 A | 3/1998 | Margerum et al. |
| 5,731,060 A | 3/1998 | Hirukawa et al. |
| 5,731,853 A | 3/1998 | Taketomi et al. |
| 5,742,262 A | 4/1998 | Tabata et al. |
| 5,751,452 A | 5/1998 | Tanaka et al. |
| 5,760,931 A | 6/1998 | Saburi et al. |
| 5,764,414 A | 6/1998 | King et al. |
| 5,790,288 A | 8/1998 | Jager et al. |
| 5,812,608 A | 9/1998 | Valimaki et al. |
| 5,822,127 A | 10/1998 | Chen et al. |
| 5,841,507 A | 11/1998 | Barnes |
| 5,856,842 A | 1/1999 | Tedesco |
| 5,868,951 A | 2/1999 | Schuck et al. |
| 5,886,822 A | 3/1999 | Spitzer |
| 5,892,598 A | 4/1999 | Asakawa et al. |
| 5,898,511 A | 4/1999 | Mizutani et al. |
| 5,903,395 A | 5/1999 | Rallison et al. |
| 5,907,416 A | 5/1999 | Hegg et al. |
| 5,907,436 A | 5/1999 | Perry et al. |
| 5,917,459 A | 6/1999 | Son et al. |
| 5,926,147 A | 7/1999 | Sehm et al. |
| 5,929,946 A | 7/1999 | Sharp et al. |
| 5,937,115 A | 8/1999 | Domash |
| 5,942,157 A | 8/1999 | Sutherland et al. |
| 5,945,893 A | 8/1999 | Plessky et al. |
| 5,949,302 A | 9/1999 | Sarkka |
| 5,966,223 A | 10/1999 | Friesem et al. |
| 5,985,422 A | 11/1999 | Krauter |
| 5,991,087 A | 11/1999 | Rallison |
| 5,999,314 A | 12/1999 | Asakura et al. |
| 6,042,947 A | 3/2000 | Asakura et al. |
| 6,043,585 A | 3/2000 | Plessky et al. |
| 6,075,626 A | 6/2000 | Mizutani et al. |
| 6,078,427 A | 6/2000 | Fontaine et al. |
| 6,115,152 A | 9/2000 | Popovich et al. |
| 6,127,066 A | 10/2000 | Ueda et al. |
| 6,137,630 A | 10/2000 | Tsou et al. |
| 6,169,613 B1 | 1/2001 | Amitai et al. |
| 6,176,837 B1 | 1/2001 | Foxlin |
| 6,195,206 B1 | 2/2001 | Yona et al. |
| 6,222,675 B1 | 4/2001 | Mall et al. |
| 6,222,971 B1 | 4/2001 | Veligdan et al. |
| 6,249,386 B1 | 6/2001 | Yona et al. |
| 6,259,423 B1 | 7/2001 | Tokito et al. |
| 6,259,559 B1 | 7/2001 | Kobayashi et al. |
| 6,285,813 B1 | 9/2001 | Schultz et al. |
| 6,317,083 B1 | 11/2001 | Johnson et al. |
| 6,317,227 B1 | 11/2001 | Mizutani et al. |
| 6,321,069 B1 | 11/2001 | Piirainen |
| 6,327,089 B1 | 12/2001 | Hosaki et al. |
| 6,333,819 B1 | 12/2001 | Svedenkrans |
| 6,340,540 B1 | 1/2002 | Ueda et al. |
| 6,351,333 B2 | 2/2002 | Araki et al. |
| 6,356,172 B1 | 3/2002 | Koivisto et al. |
| 6,359,730 B2 | 3/2002 | Tervonen |
| 6,359,737 B1 | 3/2002 | Stringfellow |
| 6,366,378 B1 | 4/2002 | Tervonen et al. |
| 6,392,812 B1 | 5/2002 | Howard |
| 6,409,687 B1 | 6/2002 | Foxlin |
| 6,470,132 B1 | 10/2002 | Nousiainen et al. |
| 6,486,997 B1 | 11/2002 | Bruzzone et al. |
| 6,504,518 B1 | 1/2003 | Kuwayama et al. |
| 6,524,771 B2 | 2/2003 | Maeda et al. |
| 6,545,778 B2 | 4/2003 | Ono et al. |
| 6,550,949 B1 | 4/2003 | Bauer et al. |
| 6,557,413 B2 | 5/2003 | Nieminen et al. |
| 6,563,648 B2 | 5/2003 | Gleckman et al. |
| 6,580,529 B1 | 6/2003 | Amitai et al. |
| 6,583,873 B1 | 6/2003 | Goncharov et al. |
| 6,587,619 B1 | 7/2003 | Kinoshita |
| 6,598,987 B1 | 7/2003 | Parikka |
| 6,608,720 B1 | 8/2003 | Freeman |
| 6,611,253 B1 | 8/2003 | Cohen |
| 6,646,810 B2 | 11/2003 | Harter et al. |
| 6,661,578 B2 | 12/2003 | Hedrick |
| 6,674,578 B2 | 1/2004 | Sugiyama et al. |
| 6,686,815 B1 | 2/2004 | Mirshekarl-Syahkal et al. |
| 6,690,516 B2 | 2/2004 | Aritake et al. |

(56) References Cited

U.S. PATENT DOCUMENTS

| | | |
|---|---|---|
| 6,721,096 B2 | 4/2004 | Bruzzone et al. |
| 6,741,189 B1 | 5/2004 | Gibbons, II et al. |
| 6,744,478 B1 | 6/2004 | Asakura et al. |
| 6,748,342 B1 | 6/2004 | Dickhaus |
| 6,750,941 B2 | 6/2004 | Satoh et al. |
| 6,750,995 B2 | 6/2004 | Dickson |
| 6,757,105 B2 | 6/2004 | Niv et al. |
| 6,771,403 B1 | 8/2004 | Endo et al. |
| 6,776,339 B2 | 8/2004 | Piikivi |
| 6,781,701 B1 | 8/2004 | Sweetser et al. |
| 6,805,490 B2 | 10/2004 | Levola |
| 6,825,987 B2 | 11/2004 | Repetto et al. |
| 6,829,095 B2 | 12/2004 | Amitai |
| 6,833,955 B2 | 12/2004 | Niv |
| 6,836,369 B2 | 12/2004 | Fujikawa et al. |
| 6,844,212 B2 | 1/2005 | Bond et al. |
| 6,844,980 B2 | 1/2005 | He et al. |
| 6,847,274 B2 | 1/2005 | Salmela et al. |
| 6,847,488 B2 | 1/2005 | Travis |
| 6,853,491 B1 | 2/2005 | Ruhle et al. |
| 6,864,861 B2 | 3/2005 | Schehrer et al. |
| 6,864,927 B1 | 3/2005 | Cathey |
| 6,885,483 B2 | 4/2005 | Takada |
| 6,903,872 B2 | 6/2005 | Schrader |
| 6,909,345 B1 | 6/2005 | Salmela et al. |
| 6,917,375 B2 | 7/2005 | Akada et al. |
| 6,922,267 B2 | 7/2005 | Endo et al. |
| 6,926,429 B2 | 8/2005 | Barlow et al. |
| 6,940,361 B1 | 9/2005 | Jokio et al. |
| 6,950,173 B1 | 9/2005 | Sutherland et al. |
| 6,950,227 B2 | 9/2005 | Schrader |
| 6,951,393 B2 | 10/2005 | Koide |
| 6,952,312 B2 | 10/2005 | Weber et al. |
| 6,958,662 B1 | 10/2005 | Salmela et al. |
| 6,987,908 B2 | 1/2006 | Bond et al. |
| 7,003,187 B2 | 2/2006 | Frick et al. |
| 7,018,744 B2 | 3/2006 | Otaki et al. |
| 7,021,777 B2 | 4/2006 | Amitai |
| 7,026,892 B2 | 4/2006 | Kajiya |
| 7,027,671 B2 | 4/2006 | Huck et al. |
| 7,034,748 B2 | 4/2006 | Kajiya |
| 7,053,735 B2 | 5/2006 | Salmela et al. |
| 7,058,434 B2 | 6/2006 | Wang et al. |
| 7,095,562 B1 | 8/2006 | Peng et al. |
| 7,101,048 B2 | 9/2006 | Travis |
| 7,110,184 B1 | 9/2006 | Yona et al. |
| 7,123,418 B2 | 10/2006 | Weber et al. |
| 7,126,418 B2 | 10/2006 | Hunton et al. |
| 7,126,583 B1 | 10/2006 | Breed |
| 7,132,200 B1 | 11/2006 | Ueda et al. |
| 7,149,385 B2 | 12/2006 | Parikka et al. |
| 7,151,246 B2 | 12/2006 | Fein et al. |
| 7,158,095 B2 | 1/2007 | Jenson et al. |
| 7,181,105 B2 | 2/2007 | Teramura et al. |
| 7,181,108 B2 | 2/2007 | Levola |
| 7,184,615 B2 | 2/2007 | Levola |
| 7,190,849 B2 | 3/2007 | Katase |
| 7,199,934 B2 | 4/2007 | Yamasaki |
| 7,205,960 B2 | 4/2007 | David |
| 7,205,964 B1 | 4/2007 | Yokoyama et al. |
| 7,206,107 B2 | 4/2007 | Levola |
| 7,230,767 B2 | 6/2007 | Walck et al. |
| 7,242,527 B2 | 7/2007 | Spitzer et al. |
| 7,248,128 B2 | 7/2007 | Mattila et al. |
| 7,259,906 B1 | 8/2007 | Islam |
| 7,268,946 B2 | 9/2007 | Wang |
| 7,285,903 B2 | 10/2007 | Cull et al. |
| 7,286,272 B2 * | 10/2007 | Mukawa ............ G02B 5/1876 345/7 |
| 7,289,069 B2 | 10/2007 | Ranta |
| 7,299,983 B2 | 11/2007 | Piikivi |
| 7,313,291 B2 | 12/2007 | Okhotnikov et al. |
| 7,319,573 B2 | 1/2008 | Nishiyama |
| 7,320,534 B2 | 1/2008 | Sugikawa et al. |
| 7,323,275 B2 | 1/2008 | Otaki et al. |
| 7,336,271 B2 | 2/2008 | Ozeki et al. |
| 7,339,737 B2 | 3/2008 | Urey et al. |
| 7,339,742 B2 | 3/2008 | Amitai et al. |
| 7,375,870 B2 | 5/2008 | Schorpp |
| 7,391,573 B2 | 6/2008 | Amitai |
| 7,394,865 B2 | 7/2008 | Borran et al. |
| 7,395,181 B2 | 7/2008 | Foxlin |
| 7,397,606 B1 | 7/2008 | Peng et al. |
| 7,401,920 B1 | 7/2008 | Kranz et al. |
| 7,404,644 B2 | 7/2008 | Evans et al. |
| 7,410,286 B2 | 8/2008 | Travis |
| 7,411,637 B2 | 8/2008 | Weiss |
| 7,415,173 B2 | 8/2008 | Kassamakov et al. |
| 7,418,170 B2 | 8/2008 | Mukawa et al. |
| 7,433,116 B1 | 10/2008 | Islam |
| 7,436,568 B1 | 10/2008 | Kuykendall, Jr. |
| 7,454,103 B2 | 11/2008 | Parriaux |
| 7,457,040 B2 | 11/2008 | Amitai |
| 7,466,994 B2 | 12/2008 | Pihlaja et al. |
| 7,479,354 B2 | 1/2009 | Ueda et al. |
| 7,480,215 B2 | 1/2009 | Makela et al. |
| 7,482,996 B2 | 1/2009 | Larson et al. |
| 7,483,604 B2 | 1/2009 | Levola |
| 7,492,512 B2 | 2/2009 | Niv et al. |
| 7,496,293 B2 | 2/2009 | Shamir et al. |
| 7,500,104 B2 | 3/2009 | Goland |
| 7,528,385 B2 | 5/2009 | Volodin et al. |
| 7,545,429 B2 | 6/2009 | Travis |
| 7,550,234 B2 | 6/2009 | Otaki et al. |
| 7,567,372 B2 | 7/2009 | Schorpp |
| 7,570,429 B2 | 8/2009 | Maliah et al. |
| 7,572,555 B2 | 8/2009 | Takizawa et al. |
| 7,573,640 B2 | 8/2009 | Nivon et al. |
| 7,576,916 B2 | 8/2009 | Amitai |
| 7,577,326 B2 | 8/2009 | Amitai |
| 7,579,119 B2 | 8/2009 | Ueda et al. |
| 7,588,863 B2 | 9/2009 | Takizawa et al. |
| 7,589,900 B1 | 9/2009 | Powell |
| 7,589,901 B2 | 9/2009 | DeJong et al. |
| 7,592,988 B2 | 9/2009 | Katase |
| 7,593,575 B2 | 9/2009 | Houle et al. |
| 7,597,447 B2 | 10/2009 | Larson et al. |
| 7,599,012 B2 | 10/2009 | Nakamura et al. |
| 7,600,893 B2 | 10/2009 | Laino et al. |
| 7,602,552 B1 | 10/2009 | Blumenfeld |
| 7,616,270 B2 | 11/2009 | Hirabayashi et al. |
| 7,618,750 B2 | 11/2009 | Ueda et al. |
| 7,629,086 B2 | 12/2009 | Otaki et al. |
| 7,639,911 B2 | 12/2009 | Lee et al. |
| 7,643,214 B2 | 1/2010 | Amitai |
| 7,656,585 B1 | 2/2010 | Powell et al. |
| 7,660,047 B1 | 2/2010 | Travis et al. |
| 7,672,055 B2 | 3/2010 | Amitai |
| 7,710,654 B2 | 5/2010 | Ashkenazi et al. |
| 7,724,441 B2 | 5/2010 | Amitai |
| 7,724,442 B2 | 5/2010 | Amitai |
| 7,724,443 B2 | 5/2010 | Amitai |
| 7,733,572 B1 | 6/2010 | Brown et al. |
| 7,747,113 B2 | 6/2010 | Mukawa et al. |
| 7,751,122 B2 | 7/2010 | Amitai |
| 7,764,413 B2 | 7/2010 | Levola |
| 7,777,819 B2 | 8/2010 | Simmonds |
| 7,778,305 B2 | 8/2010 | Parriaux et al. |
| 7,778,508 B2 | 8/2010 | Hirayama |
| 7,847,235 B2 | 12/2010 | Krupkin et al. |
| 7,864,427 B2 | 1/2011 | Korenaga et al. |
| 7,865,080 B2 | 1/2011 | Hecker et al. |
| 7,872,804 B2 | 1/2011 | Moon et al. |
| 7,884,985 B2 | 2/2011 | Amitai et al. |
| 7,887,186 B2 | 2/2011 | Watanabe |
| 7,903,921 B2 | 3/2011 | Ostergard |
| 7,907,342 B2 | 3/2011 | Simmonds et al. |
| 7,920,787 B2 | 4/2011 | Gentner et al. |
| 7,944,428 B2 | 5/2011 | Travis |
| 7,969,644 B2 | 6/2011 | Tilleman et al. |
| 7,970,246 B2 | 6/2011 | Travis et al. |
| 7,976,208 B2 | 7/2011 | Travis |
| 7,999,982 B2 | 8/2011 | Endo et al. |
| 8,000,491 B2 | 8/2011 | Brodkin et al. |

(56) References Cited

U.S. PATENT DOCUMENTS

| | | |
|---|---|---|
| 8,004,765 B2 | 8/2011 | Amitai |
| 8,016,475 B2 | 9/2011 | Travis |
| 8,022,942 B2 | 9/2011 | Bathiche et al. |
| RE42,992 E | 12/2011 | David |
| 8,079,713 B2 | 12/2011 | Ashkenazi |
| 8,082,222 B2 | 12/2011 | Rangarajan et al. |
| 8,086,030 B2 | 12/2011 | Gordon et al. |
| 8,089,568 B1 | 1/2012 | Brown et al. |
| 8,107,023 B2 | 1/2012 | Simmonds et al. |
| 8,107,780 B2 | 1/2012 | Simmonds |
| 8,132,948 B2 | 3/2012 | Owen et al. |
| 8,132,976 B2 | 3/2012 | Odell et al. |
| 8,136,690 B2 | 3/2012 | Fang et al. |
| 8,137,981 B2 | 3/2012 | Andrew et al. |
| 8,149,086 B2 | 4/2012 | Klein et al. |
| 8,152,315 B2 | 4/2012 | Travis et al. |
| 8,155,489 B2 | 4/2012 | Saarikko et al. |
| 8,159,752 B2 | 4/2012 | Wertheim et al. |
| 8,160,409 B2 | 4/2012 | Large |
| 8,160,411 B2 | 4/2012 | Levola et al. |
| 8,186,874 B2 | 5/2012 | Sinbar et al. |
| 8,188,925 B2 | 5/2012 | DeJean |
| 8,189,263 B1 | 5/2012 | Wang et al. |
| 8,189,973 B2 | 5/2012 | Travis et al. |
| 8,199,803 B2 | 6/2012 | Hauske et al. |
| 8,213,065 B2 | 7/2012 | Mukawa |
| 8,233,204 B1 | 7/2012 | Robbins et al. |
| 8,253,914 B2 | 8/2012 | Kajiya et al. |
| 8,254,031 B2 | 8/2012 | Levola |
| 8,295,710 B2 | 10/2012 | Marcus |
| 8,301,031 B2 | 10/2012 | Gentner et al. |
| 8,305,577 B2 | 11/2012 | Kivioja et al. |
| 8,306,423 B2 | 11/2012 | Gottwald et al. |
| 8,314,819 B2 | 11/2012 | Kimmel et al. |
| 8,321,810 B2 | 11/2012 | Heintze |
| 8,335,040 B2 | 12/2012 | Mukawa et al. |
| 8,351,744 B2 | 1/2013 | Travis et al. |
| 8,354,806 B2 | 1/2013 | Travis et al. |
| 8,355,610 B2 | 1/2013 | Simmonds |
| 8,369,019 B2 | 2/2013 | Baker et al. |
| 8,384,694 B2 | 2/2013 | Powell et al. |
| 8,398,242 B2 | 3/2013 | Yamamoto et al. |
| 8,403,490 B2 | 3/2013 | Sugiyama et al. |
| 8,422,840 B2 | 4/2013 | Large |
| 8,427,439 B2 | 4/2013 | Larsen et al. |
| 8,432,363 B2 | 4/2013 | Saarikko et al. |
| 8,432,372 B2 | 4/2013 | Butler et al. |
| 8,472,119 B1 | 6/2013 | Kelly |
| 8,477,261 B2 | 7/2013 | Travis et al. |
| 8,491,121 B2 | 7/2013 | Tilleman et al. |
| 8,491,136 B2 | 7/2013 | Travis et al. |
| 8,493,366 B2 | 7/2013 | Bathiche et al. |
| 8,493,662 B2 | 7/2013 | Noui |
| 8,508,848 B2 | 8/2013 | Saarikko |
| 8,547,638 B2 | 10/2013 | Levola |
| 8,578,038 B2 | 11/2013 | Kaikuranta et al. |
| 8,581,831 B2 | 11/2013 | Travis |
| 8,582,206 B2 | 11/2013 | Travis |
| 8,593,734 B2 | 11/2013 | Laakkonen |
| 8,611,014 B2 | 12/2013 | Valera et al. |
| 8,619,062 B2 | 12/2013 | Powell et al. |
| 8,633,786 B2 | 1/2014 | Ermolov et al. |
| 8,634,139 B1* | 1/2014 | Brown ............... G01C 3/06 359/630 |
| 8,639,072 B2 | 1/2014 | Popovich et al. |
| 8,643,691 B2 | 2/2014 | Rosenfeld et al. |
| 8,649,099 B2 | 2/2014 | Schultz et al. |
| 8,654,420 B2 | 2/2014 | Simmonds |
| 8,670,029 B2 | 3/2014 | McEldowney |
| 8,693,087 B2 | 4/2014 | Nowatzyk et al. |
| 8,736,802 B2 | 5/2014 | Kajiya et al. |
| 8,736,963 B2 | 5/2014 | Robbins et al. |
| 8,749,886 B2* | 6/2014 | Gupta ............... G02B 5/3041 359/489.09 |
| 8,749,890 B1* | 6/2014 | Wood ............... G02B 27/0149 359/632 |
| 8,767,294 B2 | 7/2014 | Chen et al. |
| 8,810,600 B2 | 8/2014 | Bohn et al. |
| 8,814,691 B2 | 8/2014 | Haddick et al. |
| 8,830,584 B2 | 9/2014 | Saarikko et al. |
| 8,903,207 B1 | 12/2014 | Brown et al. |
| 8,913,324 B2 | 12/2014 | Schrader |
| 8,937,772 B1 | 1/2015 | Burns et al. |
| 8,938,141 B2 | 1/2015 | Magnusson |
| 2002/0021461 A1 | 2/2002 | Ono et al. |
| 2002/0131175 A1 | 9/2002 | Yagi et al. |
| 2003/0030912 A1* | 2/2003 | Gleckman ......... G02B 27/0172 359/633 |
| 2003/0039442 A1 | 2/2003 | Bond et al. |
| 2003/0063042 A1 | 4/2003 | Friesem et al. |
| 2003/0149346 A1 | 8/2003 | Arnone et al. |
| 2003/0228019 A1 | 12/2003 | Eichler et al. |
| 2004/0089842 A1 | 5/2004 | Sutehrland et al. |
| 2004/0188617 A1 | 9/2004 | Devitt et al. |
| 2004/0208446 A1 | 10/2004 | Bond et al. |
| 2004/0208466 A1 | 10/2004 | Mossberg et al. |
| 2005/0135747 A1 | 6/2005 | Greiner et al. |
| 2005/0136260 A1 | 6/2005 | Garcia |
| 2005/0259302 A9 | 11/2005 | Metz et al. |
| 2005/0269481 A1 | 12/2005 | David et al. |
| 2006/0093793 A1 | 5/2006 | Miyakawa et al. |
| 2006/0114564 A1 | 6/2006 | Sutherland et al. |
| 2006/0119916 A1 | 6/2006 | Sutherland et al. |
| 2006/0132914 A1 | 6/2006 | Weiss et al. |
| 2006/0221448 A1 | 10/2006 | Nivon et al. |
| 2006/0228073 A1 | 10/2006 | Mukawa et al. |
| 2006/0279662 A1 | 12/2006 | Kapellner et al. |
| 2006/0291021 A1 | 12/2006 | Mukawa |
| 2007/0019152 A1 | 1/2007 | Caputo et al. |
| 2007/0019297 A1 | 1/2007 | Stewart et al. |
| 2007/0041684 A1 | 2/2007 | Popovich et al. |
| 2007/0045596 A1 | 3/2007 | King et al. |
| 2007/0052929 A1 | 3/2007 | Allman et al. |
| 2007/0089625 A1 | 4/2007 | Grinberg et al. |
| 2007/0133920 A1 | 6/2007 | Lee et al. |
| 2007/0133983 A1 | 6/2007 | Traff |
| 2007/0188837 A1 | 8/2007 | Shimizu et al. |
| 2007/0211164 A1 | 9/2007 | Olsen et al. |
| 2008/0043334 A1 | 2/2008 | Itzkovitch et al. |
| 2008/0106775 A1 | 5/2008 | Amitai et al. |
| 2008/0136923 A1 | 6/2008 | Inbar et al. |
| 2008/0151379 A1 | 6/2008 | Amitai |
| 2008/0186604 A1 | 8/2008 | Amitai |
| 2008/0198471 A1 | 8/2008 | Amitai |
| 2008/0278812 A1 | 11/2008 | Amitai |
| 2008/0285140 A1 | 11/2008 | Amitai |
| 2008/0309586 A1 | 12/2008 | Vitale |
| 2009/0017424 A1 | 1/2009 | Yoeli et al. |
| 2009/0019222 A1 | 1/2009 | Verma et al. |
| 2009/0052046 A1 | 2/2009 | Amitai |
| 2009/0052047 A1 | 2/2009 | Amitai |
| 2009/0067774 A1 | 3/2009 | Magnusson |
| 2009/0097122 A1 | 4/2009 | Niv |
| 2009/0097127 A1 | 4/2009 | Amitai |
| 2009/0121301 A1 | 5/2009 | Chang |
| 2009/0122413 A1 | 5/2009 | Hoffman et al. |
| 2009/0122414 A1 | 5/2009 | Amitai |
| 2009/0128902 A1 | 5/2009 | Niv et al. |
| 2009/0128911 A1 | 5/2009 | Itzkovitch et al. |
| 2009/0153437 A1 | 6/2009 | Aharoni |
| 2009/0190222 A1 | 7/2009 | Simmonds et al. |
| 2009/0213208 A1 | 8/2009 | Glatt |
| 2009/0237804 A1 | 9/2009 | Amitai et al. |
| 2009/0303599 A1 | 12/2009 | Levola |
| 2009/0316246 A1 | 12/2009 | Asai et al. |
| 2010/0039796 A1 | 2/2010 | Mukawa |
| 2010/0060551 A1 | 3/2010 | Sugiyama et al. |
| 2010/0060990 A1 | 3/2010 | Wertheim et al. |
| 2010/0079865 A1 | 4/2010 | Saarikko et al. |
| 2010/0092124 A1 | 4/2010 | Magnusson et al. |
| 2010/0096562 A1 | 4/2010 | Klunder et al. |
| 2010/0103078 A1 | 4/2010 | Mukawa et al. |
| 2010/0136319 A1 | 6/2010 | Imai et al. |

(56) References Cited

U.S. PATENT DOCUMENTS

| | | |
|---|---|---|
| 2010/0141555 A1 | 6/2010 | Rorberg et al. |
| 2010/0165465 A1 | 7/2010 | Levola |
| 2010/0171680 A1 | 7/2010 | Lapidot et al. |
| 2010/0177388 A1 | 7/2010 | Cohen et al. |
| 2010/0214659 A1 | 8/2010 | Levola |
| 2010/0231693 A1 | 9/2010 | Levola |
| 2010/0231705 A1 | 9/2010 | Yahav et al. |
| 2010/0232003 A1 | 9/2010 | Baldy et al. |
| 2010/0246004 A1 | 9/2010 | Simmonds |
| 2010/0246993 A1 | 9/2010 | Rieger et al. |
| 2010/0265117 A1 | 10/2010 | Weiss |
| 2010/0277803 A1 | 11/2010 | Pockett et al. |
| 2010/0284085 A1 | 11/2010 | Laakkonen |
| 2010/0296163 A1 | 11/2010 | Saarikko |
| 2010/0315719 A1 | 12/2010 | Saarikko et al. |
| 2010/0321781 A1 | 12/2010 | Levola et al. |
| 2011/0019250 A1 | 1/2011 | Aiki et al. |
| 2011/0019874 A1 | 1/2011 | Jarvenpaa et al. |
| 2011/0026128 A1 | 2/2011 | Baker et al. |
| 2011/0026774 A1 | 2/2011 | Flohr et al. |
| 2011/0038024 A1 | 2/2011 | Wang et al. |
| 2011/0050548 A1 | 3/2011 | Blumenfeld et al. |
| 2011/0096401 A1 | 4/2011 | Levola |
| 2011/0157707 A1 | 6/2011 | Tilleman et al. |
| 2011/0164221 A1 | 7/2011 | Tilleman et al. |
| 2011/0211239 A1 | 9/2011 | Mukawa et al. |
| 2011/0235179 A1 | 9/2011 | Simmonds |
| 2011/0238399 A1 | 9/2011 | Ophir et al. |
| 2011/0242349 A1 | 10/2011 | Izuha et al. |
| 2011/0242661 A1 | 10/2011 | Simmonds |
| 2011/0242670 A1 | 10/2011 | Simmonds |
| 2011/0310356 A1 | 12/2011 | Vallius |
| 2012/0007979 A1 | 1/2012 | Schneider et al. |
| 2012/0033306 A1 | 2/2012 | Valera et al. |
| 2012/0044572 A1 | 2/2012 | Simmonds et al. |
| 2012/0044573 A1 | 2/2012 | Simmonds et al. |
| 2012/0062850 A1 | 3/2012 | Travis |
| 2012/0099203 A1 | 4/2012 | Boubis et al. |
| 2012/0105634 A1 | 5/2012 | Meidan et al. |
| 2012/0120493 A1 | 5/2012 | Simmonds et al. |
| 2012/0127577 A1 | 5/2012 | Desserouer |
| 2012/0224062 A1 | 9/2012 | Lacoste et al. |
| 2012/0235884 A1 | 9/2012 | Miller et al. |
| 2012/0235900 A1 | 9/2012 | Border et al. |
| 2012/0242661 A1 | 9/2012 | Takagi et al. |
| 2012/0280956 A1 | 11/2012 | Yamamoto et al. |
| 2012/0300311 A1 | 11/2012 | Simmonds et al. |
| 2012/0320460 A1 | 12/2012 | Levola |
| 2013/0069850 A1 | 3/2013 | Mukawa et al. |
| 2013/0101253 A1 | 4/2013 | Popovich et al. |
| 2013/0138275 A1 | 5/2013 | Nauman et al. |
| 2013/0141937 A1 | 6/2013 | Katsuta et al. |
| 2013/0170031 A1 | 7/2013 | Bohn et al. |
| 2013/0200710 A1 | 8/2013 | Robbins |
| 2013/0249895 A1 | 9/2013 | Westerinen et al. |
| 2013/0257848 A1 | 10/2013 | Westerinen et al. |
| 2013/0258701 A1 | 10/2013 | Westerinen et al. |
| 2013/0314793 A1 | 11/2013 | Robbins et al. |
| 2013/0322810 A1 | 12/2013 | Robbins |
| 2013/0328948 A1 | 12/2013 | Kunkel et al. |
| 2014/0104665 A1 | 4/2014 | Popovich et al. |
| 2014/0104685 A1 | 4/2014 | Bohn et al. |
| 2014/0140653 A1 | 5/2014 | Brown et al. |
| 2014/0140654 A1 | 5/2014 | Brown et al. |
| 2014/0146394 A1 | 5/2014 | Tout et al. |
| 2014/0152778 A1 | 6/2014 | Ihlenburg et al. |
| 2014/0168055 A1 | 6/2014 | Smith |
| 2014/0168260 A1 | 6/2014 | O'Brien et al. |
| 2014/0168735 A1 | 6/2014 | Yuan et al. |
| 2014/0172296 A1 | 6/2014 | Shtukater |
| 2014/0176528 A1 | 6/2014 | Robbins |
| 2014/0204455 A1 | 7/2014 | Popovich et al. |
| 2014/0211322 A1 | 7/2014 | Bohn et al. |
| 2014/0218801 A1 | 8/2014 | Simmonds et al. |
| 2015/0010265 A1 | 1/2015 | Popovich et al. |
| 2015/0289762 A1 | 10/2015 | Popovich et al. |

FOREIGN PATENT DOCUMENTS

| | | |
|---|---|---|
| EP | 0 822 441 | 2/1998 |
| EP | 2 110 701 | 10/2009 |
| EP | 2 225 592 | 9/2010 |
| EP | 2 381 290 | 10/2011 |
| EP | 2 733 517 | 5/2014 |
| FR | 2677463 | 12/1992 |
| GB | 2 115 178 A | 9/1983 |
| JP | 2004-157245 | 6/2004 |
| WO | WO-99/52002 | 10/1999 |
| WO | WO-03/081320 A1 | 10/2003 |
| WO | WO-2006/002870 | 1/2006 |
| WO | WO-2007/130130 A2 | 11/2007 |
| WO | WO-2007/130130 A3 | 11/2007 |
| WO | WO-2009/013597 A2 | 1/2009 |
| WO | WO-2009/077802 | 6/2009 |
| WO | WO-2010/067114 | 6/2010 |
| WO | WO-2010/067117 | 6/2010 |
| WO | WO-2010/125337 A2 | 11/2010 |
| WO | WO-2010/125337 A3 | 11/2010 |
| WO | WO-2011/012825 | 2/2011 |
| WO | WO-2011/051660 A1 | 5/2011 |
| WO | WO-2011/055109 A2 | 5/2011 |
| WO | WO-2011/107831 | 9/2011 |
| WO | WO-2013/027006 A1 | 2/2013 |
| WO | WO-2013/033274 A1 | 3/2013 |
| WO | WO-2013/163347 | 10/2013 |
| WO | WO-2014/091200 | 6/2014 |

OTHER PUBLICATIONS

U.S. Appl. No. 13/250,858, filed Sep. 30, 2011, Brown et al.
U.S. Appl. No. 13/250,940, filed Sep. 30, 2011, Stahl et al.
U.S. Appl. No. 13/432,662, filed Mar. 28, 2012, Brown et al.
U.S. Appl. No. 14/497,280, filed Sep. 25, 2014, Stanley et al.
U.S. Appl. No. 14/715,332, filed May 18, 2015, Brown et al.
Extract of US 2010/0296163 (Saarikko), Figure 2 as marked up by Examiner in Final Office Action for U.S. Appl. No. 14/044,676 dated Oct. 20, 2015, 1 page.
Final Office Action on U.S. Appl. No. 14/044,676, dated Oct. 20, 2015, 18 pages.
Final Office Action on U.S. Appl. No. 13/250,858, dated Oct. 7, 2015, 20 pages.
Final Office Action on U.S. Appl. No. 13/432,662, dated Oct. 29, 2015, 9 pages.
Notice of Allowance on U.S. Appl. No. 14/038,400, dated Oct. 30, 2015, 9 pages.
Second office action received in Chinese patent application No. 201380001530.1, dated Oct. 12, 2015, 5 pages with English translation.
Final Office Action on U.S. Appl. No. 13/892,026 dated Nov. 20, 2015, 25 pages.
Final Office Action on U.S. Appl. No. 13/892,057 dated Nov. 20, 2015, 30 pages.
Final Office Action on U.S. Appl. No. 14/152,756 dated Dec. 21, 2015, 15 pages.
Non-Final Office Action on U.S. Appl. No. 14/465,763, dated Nov. 19, 2015, 4 pages.
Notice of Allowance on U.S. Appl. No. 14/225,062, dated Dec. 2, 2015, 10 pages.
Non-Final Office Action on U.S. Appl. No. 13/844,456, dated Jan. 15, 2016, 16 Pages.
Non-Final Office Action on U.S. Appl. No. 14/044,676, dated Jan. 20, 2016, 21 pages.
Notice of Allowance for U.S. Appl. No. 14/109,551, dated Nov. 20, 2015, 8 pages.
Notice of Allowance on U.S. Appl. No. 13/432,662, dated Feb. 18, 2016, 10 pages.
Extended European Search Report for European Application No. 13765610.4 dated Feb. 16, 2016, 6 pages.

(56) References Cited

OTHER PUBLICATIONS

Final Office Action on U.S. Appl. No. 14/168,173, dated Nov. 4, 2015, 10 pages.
Non-Final Office Action on U.S. Appl. No. 13/864,991 dated Nov. 30, 2015, 18 pages.
Non-Final Office Action on U.S. Appl. No. 13/892,026 dated Mar. 22, 2016, 16 pages.
Non-Final Office Action on U.S. Appl. No. 14/152,756, dated Apr. 26, 2016, 17 pages.
Non-Final Office Action on U.S. Appl. No. 14/168,173 dated Mar. 10, 2016, 9 pages.
Non-Final Office Action on U.S. Appl. No. 14/260,943 dated Feb. 3, 2016, 19 pages.
Non-Final Office Action on U.S. Appl. No. 13/250,858, dated Mar. 18, 2016, 20 pages.
Final Office Action on U.S. Appl. No. 13/250,858, dated Jul. 11, 2016, 21 pages.
Non-Final Office Action on U.S. Appl. No. 13/892,057, dated May 16, 2016, 23 pages.
Notice of Allowance on U.S. Appl. No. 13/892,026, dated Jul. 18, 2016, 10 pages.
Final Office Action on U.S. Appl. No. 13/869,866 Dated Oct. 3, 2014, 17 pages.
Final Office Action on U.S. Appl. No. 14/038,400 Dated Aug. 10, 2015, 32 pages.
First office action received in Chinese patent application No. 201380001530.1, dated Jun. 30, 2015, 9 pages with English translation.
Non-Final Office Action on U.S. Appl. No. 13/869,866 Dated Jul. 22, 2015, 28 pages.
Non-Final Office Action on U.S. Appl. No. 13/892,026 Dates Aug. 6, 2015, 22 pages.
Non-Final Office Action on U.S. Appl. No. 13/892,057 dated Jul. 30, 2015, 29 pages.
Non-Final Office Action on U.S. Appl. No. 14/168,173 Dated Jun. 22, 2015, 14 pages.
Notice of Allowance on U.S. Appl. No. 13/355,360 Dated Apr. 10, 2014, 7 pages.
Office Action, U.S. Appl. No. 10/696,507, mailed on Nov. 13, 2008, 15 pages.
Amendment and Reply for U.S. Appl. No. 12/571,262, mail date Dec. 16, 2011, 7 pages.
Amitai, Y., et al. "Visor-display design based on planar holographic optics," Applied Optics, vol. 34, No. 8, Mar. 10, 1995, pp. 1352-1356.
Ayras, et al., "Exit pupil expander with a large field of view based on diffractive optics", Journal of the Society for Information Display, 17/8, 2009, pp. 659-664.
Cameron, A., The Application of Holograhpic Optical Waveguide Technology to Q-Sight Family of Helmet Mounted Displays, Proc. of SPIE, vol. 7326, 73260H-1, 2009, 11 pages.
Caputo, R. et al., POLICRYPS Switchable Holographic Grating: A Promising Grating Electro-Optical Pixel for High Resolution Display Application; Journal of Display Technology, vol. 2, No. 1, Mar. 2006, pp. 38-51, 14 pages.
Crawford, "Switchable Bragg Gratings", Optics & Photonics News, Apr. 2003, pp. 54-59.
Extended European Search Report for EP Application No. 13192383, dated Apr. 2, 2014, 7 pages.
Final Office Action in U.S. Appl. No. 13/864,991, dated Apr. 2, 2015, 16 pages.
Final Office Action on U.S. Appl. No. 13/250,858 Dated Feb. 4, 2015, 18 pages.
Final Office Action on U.S. Appl. No. 13/250,940 Dated Oct. 17, 2014, 15 pages.
Final Office Action on U.S. Appl. No. 13/892,026 Dated Apr. 3, 2015, 17 pages.
Final Office Action on U.S. Appl. No. 13/892,057 Dated Mar. 5, 2015, 21 pages.
International Preliminary Report on Patentability for PCT Application No. PCT/US2013/038070, dated Oct. 28, 2014, 6 pages.
International Search Report and Written Opinion regarding PCT/US2013/038070, mail date Aug. 14, 2013, 14 pages.
Irie, Masahiro, Photochromic diarylethenes for photonic devices, Pure and Applied Chemistry, 1996, pp. 1367-1371, vol. 68, No. 7, IUPAC.
Levola, et al., "Replicated slanted gratings with a high refractive index material for in and outcoupling of light" Optics Express, vol. 15, Issue 5, pp. 2067-2074 (2007).
Moffitt, "Head-Mounted Display Image Configurations", retrieved from the internet at http://www.kirkmoffitt.com/hmd_image_configurations.pdf on Dec. 19, 2014, dated May 2008, 25 pages.
Non-Final Office Action on U.S. Appl. No. 13/250,858 dated Jun. 12, 2015, 20 pages.
Non-Final Office Action on U.S. Appl. No. 13/250,858 Dated Sep. 15, 2014, 16 pages.
Non-Final Office Action on U.S. Appl. No. 13/250,940 Dated Mar. 18, 2015, 17 pages.
Non-Final Office Action on U.S. Appl. No. 13/432,662 Dated May 27, 2015, 15 pages.
Non-Final Office Action on U.S. Appl. No. 13/844,456 Apr. 1, 2015, XX Pages.
Non-Final Office Action on U.S. Appl. No. 13/864,991 Dated Oct. 22, 2014, 16 pages.
Non-Final Office Action on U.S. Appl. No. 13/869,866 Dated May 28, 2014, 16 pages.
Non-Final Office Action on U.S. Appl. No. 14/038,400 Dated Feb. 5, 2015, 18 pages.
Non-Final Office Action on U.S. Appl. No. 14/044,676 Dated Apr. 9, 2015, 13 pages.
Non-Final Office Action on U.S. Appl. No. 14/109,551 Dated Jul. 14, 2015, 32 pages.
Non-Final Office Action on U.S. Appl. No. 14/225,062 Dated May 21, 2015, 11 pages.
Nordin, G., et al., Journal of the Optical Society of America A., vol. 9, No. 12, Dec. 1992, pp. 2206-2217, 12 pages.
Notice of Allowance for U.S. Appl. No. 12/700,557, mail date Oct. 22, 2013, 9 pages.
Notice of Allowance on U.S. Appl. No. 13/250,970 dated Sep. 16, 2014, 7 pages.
Notice of Allowance on U.S. Appl. No. 13/251,087 Dated Jul. 17, 2014, 8 pages.
Office Action for U.S. Appl. No. 12/571,262, mail date Sep. 28, 2011, 5 pages.
Office Action for U.S. Appl. No. 12/700,557, mail date Aug. 9, 2013, 12 pages.
Office Action for U.S. Appl. No. 12/700,557, mail date Feb. 4, 2013, 11 pages.
Office Action for U.S. Appl. No. 13/250,621, mail date May 21, 2013, 10 pages.
Office Action for U.S. Appl. No. 13/250,858 mail date Feb. 19, 2014, 13 pages.
Office Action for U.S. Appl. No. 13/250,940, mail date Aug. 28, 2013, 15 pages.
Office Action for U.S. Appl. No. 13/250,940, mail date Mar. 12, 2013, 11 pages.
Office Action for U.S. Appl. No. 13/250,970, mail date Jul. 30, 2013, 4 pages.
Office Action for U.S. Appl. No. 13/250,994, mail date Sep. 16, 2013, 11 pages.
Office Action for U.S. Appl. No. 13/355,360, mail date Sep. 12, 2013, 7 pages.
Office Action on U.S. Appl. No. 13/250,940 Dated Mar. 25, 2014, 12 pages.
Office Action on U.S. Appl. No. 13/251,087 Dated Mar. 28, 2014, 12 pages.
Office Action on U.S. Appl. No. 13/892,026 Dated Dec. 8, 2014, 19 pages.
Office Action on U.S. Appl. No. 13/892,057 Dated Nov. 28, 2014, 17 pages.
Plastic has replaced glass in photochromic lens, www.plastemart.com, 2003, 1 page.

(56) References Cited

OTHER PUBLICATIONS

Press Release, "USAF Awards SBG Labs an SBIR Contract for Wide Field of View HUD", SBG Labs—DigiLens, Apr. 2013, 1 page.
Press Release: "Navy awards SGB Labs a contract for HMDs for simulation and training", Press releases, DigiLens, Oct. 2012, pp. 1-2, retrieved from the internet at http://www.digilens.com/pr10-2012.2.php. 2 pages.
Requirement for Restriction/Election on U.S. Appl. No. 13/844,456 Dated Sep. 12, 2014, 23 pages.
Restriction Requirement for U.S. Appl. No. 12/700,557, mail date Oct. 17, 2012, 5 pages.
Schechter, et al., "Compact beam expander with linear gratings", Applied Optics, vol. 41, No. 7, Mar. 1, 2002, pp. 1236-1240.
Urey, "Diffractive exit pupil expander for display applications" Applied Optics, vol. 40, Issue 32, pp. 5840-5851 (2001).
Webster's Third New International Dictionary 433 (1986), 3 pages.
Wisely, P.L., Head up and head mounted display performance improvements through advanced techniques in the manipulation of light, Proc. of SPIE vol. 7327, 732706-1, 2009, 10 pages.

\* cited by examiner

MICRO COLLIMATOR SYSTEM AND METHOD FOR A HEAD UP DISPLAY (HUD)

CROSS REFERENCE TO RELATED APPLICATIONS

The present application is related to U.S. patent application Ser. No. 13/432,662 filed on Mar. 28, 2012 entitled "System For And Method of Catadioptric Collimation In A Compact Head Up Display (HUD)," incorporated herein by reference in its entirety and assigned to the assignee of the present application which a continuation-in-part application of: U.S. Pat. No. 8,634,139 filed on Sep. 30, 2011 entitled "System For And Method of Catadioptric Collimation In A Compact Head Up Display (HUD)," incorporated herein by reference in its entirety and assigned to the assignee of the present application; "U.S. patent application Ser. No. 13/250,940, entitled, "Head Up Display (HUD) Utilizing Diffractive Gratings Having Optimized Efficiency," filed on Sep. 30, 2011, incorporated herein by reference in its entirety, and assigned to the assignee of the present application; U.S. patent application Ser. No. 13/250,858, entitled, "Ultra-Compact HUD Utilizing Waveguide Pupil Expander With Surface Relief Gratings In High Refractive Index Materials," filed on Sep. 30, 2011, incorporated herein by reference in its entirety, and assigned to the assignee of the present application; U.S. Pat. No. 8,903,207, entitled, "System for and Method of Extending Vertical Field of View in Head Up Display Utilizing a Waveguide Combiner," filed on Sep. 30, 2011, incorporated herein by reference in its entirety, and assigned to the assignee of the present application; U.S. Pat. No. 8,937,772, entitled, "System For and Method of Stowing HUD Combiners," filed on Sep. 30, 2011 and assigned to the assignee of the present application, incorporated herein by reference in its entirety; and U.S. Pat. No. 8,749,890, entitled, "Compact Head Up Display (HUD) for Cockpits with Constrained Space Envelopes," filed on Sep. 30, 2011, incorporated herein by reference herein in its entirety and assigned to the assignee of the present application.

BACKGROUND

The inventive concepts disclosed herein relate to projectors. More particularly, embodiments of the inventive concepts disclosed herein relate to projectors for head up displays (HUDs), such as, fixed HUDs and worn displays (e.g., head worn displays, helmet mounted displays, virtual glasses, etc.).

HUDs provide significant safety and operational benefits including precise energy management and conformal flight paths. These safety and operational benefits are enjoyed by operators of air transport aircraft, military aircraft, regional aircraft and high end business jets where HUDs are generally employed. These safety and operational benefits are also desirable in smaller aircraft.

Conventional HUDs are generally large, expensive and difficult to fit into smaller aircraft, such as, business and regional jets as well as general aviation airplanes. Often, conventional HUDs rely on large optical components to form adequate field of view and viewing eye box. The large optical components are often associated with collimating or non-collimating projectors and include lens, prisms, mirrors, etc. The volume of the packages including the optical components of the HUD is too large to fit within the constrained space in the cockpit of smaller aircraft. Further, conventional HUDs rely upon optical components which are generally too expensive for the cost requirements of smaller aircraft and worn displays.

Substrate guided HUDs have been proposed which use waveguide technology with diffraction gratings to preserve eye box size while reducing size of the HUD. U.S. Pat. No. 4,309,070 issued St. Leger Searle and U.S. Pat. No. 4,711,512 issued to Upatnieks disclose substrate waveguide HUDs. U.S. Pat. No. 8,634,139 discloses a catadioptric collimator for HUDs.

It is desirous to make the projector for waveguide HUDs in a compact arrangement. Aligning optical components in small projector implementations can be difficult especially as sizes are minimized. Folded paths used in conventional projectors can require optical components that add to the package size for the projector. Projectors also often require a corrector lens which can be expensive and add to size of the collimator.

Therefore, there is a need for a compact, low cost projector for HUD systems. Further, there is a need for a compact HUD which uses collimating optics optimized for constrained spaces associated with smaller aircraft and/or worn displays. Yet further, there is also a need for small volume, lightweight, lower cost collimating optics. Yet further still, there is a need for a low parts count collimating system for a substrate waveguide HUD. Still further, there is a need for collimating optics with a short focal length and a low F ratio. Yes further still, there is a need for a compact projector with increased resolution.

SUMMARY

In one aspect, embodiments of the inventive concepts disclosed herein relate to a head up display. The head up display is for use with an image source. The head up display includes a collimating mirror and a polarizing beam splitter. Light from the image source enters the beam splitter and is reflected toward the collimating mirror. The light striking the collimating mirror is reflected through the polarizing beam splitter toward a combiner.

In a further aspect, embodiments of the inventive concepts disclosed herein relate to a head up display. The head up display includes a field lens disposed to receive light directly from the image source. The field lens has a diffractive surface for increasing power of the field lens and providing color correction. The head up display also includes a polarizing beam splitter having a first face, a second face, and a third face. The field lens is disposed to provide light to the first face, and the polarizing beam splitter is configured to reflect light of a first polarization toward the second face. The light from the image source has the first polarization. The head up display system also includes a retarder disposed to receive light from the second face, and a curved reflector disposed to receive light from the retarder and provide the light from the retarder to the second face. The light entering the second face has a second polarization state and the polarizing beam splitter is configured so that the light entering the second face travels from the second face to the third face.

In a further aspect, embodiments of the inventive concepts disclosed herein relate to a head up display. The head up display includes an image source, an illuminator, a field lens arranged to receive light directly from the image source, a polarizing beam splitter having a first face, a second face, a third face, and a fourth face, a retarder disposed to receive the light provided through the second face, and a curved reflector. The field lens has a diffractive surface for providing color correction and having a higher order of aberration control, and the illuminator is arranged to illuminate the image source through the polarizing beam splitter through the fourth face and the first face. The light from the illuminator entering the fourth face has a second polarization state, and the field lens is disposed to provide the light from the image source to the first face. The polarizing beam splitter is configured to reflect light of a first polarization state through the second face, wherein the light from the image source has the first polarization state. The curved reflector is disposed to receive light from the retarder and to provide the light from the retarder back through the retarder to the second face. The light entering the second face has a second polarization state, and the polarizing beam splitter is configured so that the light entering the second face travels from the second face to the third face. The light at the third face is provided for display on the head up display.

In a further aspect, embodiments of the inventive concepts disclosed herein relate to a method of providing information to a pilot. The method includes providing light from a light source to an image source through a polarizing beam splitter, providing light from the image source to the polarizing beam splitter and reflecting the light from the image source within the polarizing beam splitter to a curved reflective surface. The method also includes providing light from the curved reflective surface through the polarizing beam splitter to a corrector lens, and providing the light from the corrector lens as collimated light to a wave guide combiner.

In still further aspect, the inventive concepts disclosed herein related to a catadioptric optical system for a head up display. The catadioptric optical system includes a polarizing beam splitter, a light source disposed on a first side of the polarizing beam splitter, an image source disposed on a second side of the polarizing beam splitter opposite the first side of the polarizing beam splitter, and a first lens disposed between the image source and the second side. The catadioptric optical system also includes a reflective surface disposed on a third side of the polarizing beam splitter, and a second element disposed on a fourth side of the polarizing beam splitter.

In still further aspect, embodiments of the inventive concepts disclosed herein related to a head up display. The head up display includes at least one light pipe and a waveguide. The at least one light pipe includes a turning grating or mirror array for providing light into the waveguide from the light pipe.

BRIEF DESCRIPTION OF THE DRAWINGS

Exemplary embodiments of the inventive concepts disclosed herein are hereafter described with reference to the accompanying drawings, wherein like numerals denote like elements; and.

DETAILED DESCRIPTION

Figure 1:
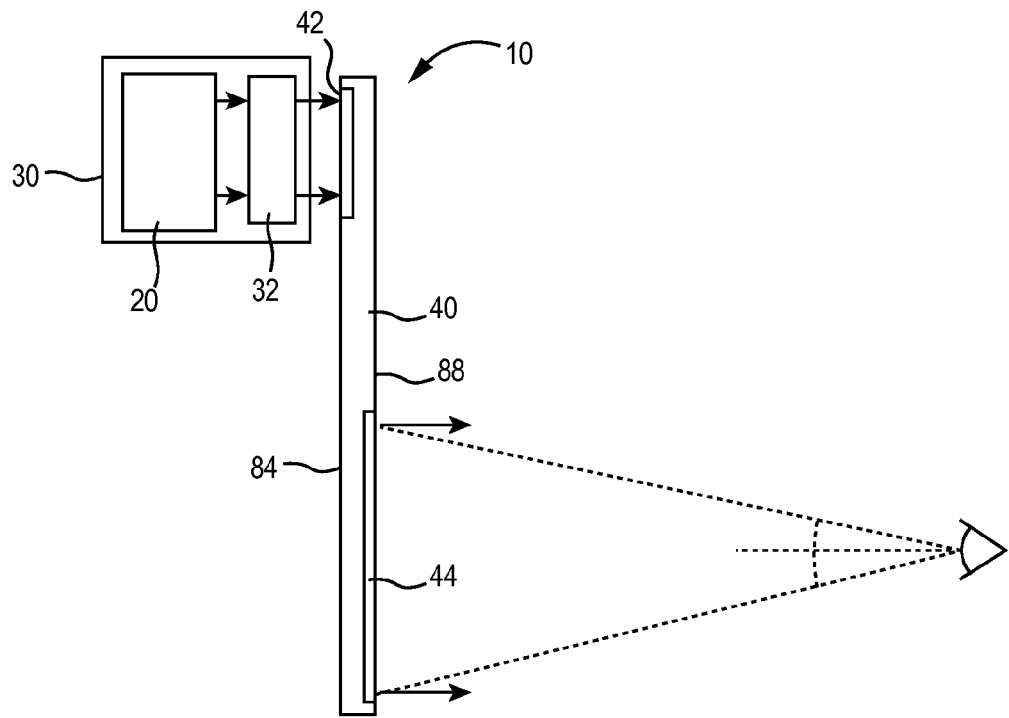
FIG. 1 is a general block diagram of a head up display (HUD) display system in accordance with some exemplary embodiments of the inventive concepts disclosed herein.

Before describing in detail the particular improved system and method, it should be observed that the inventive concepts disclosed herein include, but are not limited to, a novel structural combination of optical components and not in the particular detailed configurations thereof. Accordingly, the structure, methods, functions, control and arrangement of components have been illustrated in the drawings by readily understandable block representations and schematic drawings, in order not to obscure the disclosure with structural details which will be readily apparent to those skilled in the art, having the benefit of the description herein. Further, the inventive concepts disclosed herein are not limited to the particular embodiments depicted in the exemplary diagrams, but should be construed in accordance with the language in the claims.

In some embodiments, a collimator advantageously includes a field lens and a reflector mounted onto a cube, thereby allowing easy mechanical alignment of the field lens and the reflector under very tight tolerances. In some embodiments, a diffractive surface is added to the field lens to provide full color correction and to flatten the corrector lens so that the corrector lens becomes unnecessary. In some embodiments, the collimator is provided without a prism or other fold optics, thereby shortening the back focal length and improving performance while advantageously reducing size and weight. In some embodiments, a liquid crystal on silicon (LCOS) device is illuminated through an assembly of collimating optics to make the projector smaller. Careful polarization management can be provided through the use of a clean-up polarizer in the exit pupil when illuminating a LCOS device through the assembly in some embodiments. In some embodiments, the design of the collimating optics can be scaled to fields of view in excess of 40 degrees and to sizes smaller than 1 cm3. The collimating optics design is also compatible with organic light emitting diode (OLED) displays, active matrix liquid crystal display (AMLCDs), and other micro displays.

With reference to FIG. 1, a head up display (HUD) system 10 can be utilized in various applications, including aviation, medical, naval, targeting, ground based, military, etc. The term HUD as used herein refers to a fixed HUD, a near eye display, a worn display, a helmet mounted display or any type of display using a combiner for overlaying images from an image source over a real world scene. The HUD system 10 is configured for use in smaller cockpit environments and in worn display applications and yet provides an appropriate field of view and eye box for avionic applications in some embodiments. The HUD system 10 can be configured for use with worn components, such as, glasses, goggles, hats, helmets, etc. or be a HUD system with a fixed combiner in some embodiments.

The HUD system 10 includes a projector 30 and a substrate waveguide 40. The projector 30 provides light (an image) to the substrate waveguide 40 which operates as a combiner. The projector 30 includes an image source 20 and collimating optics 32. The projector 30 provides an image from the image source 20 and collimates the image via collimating optics 32 for display on the substrate waveguide 40. In some embodiments, the substrate waveguide 40 can be a reflective combiner or holographic combiner.

The image source 20 can be any device for providing an image including but not limited to a CRT display, a light emitting diode (LED) display, an organic light emitting diode (OLED) display, an active matrix liquid crystal display (AMLCD), a liquid crystal on silicon (LCOS) display, etc. In some embodiments, the image source 20 is a micro display and provides linearly polarized light (e.g., S or P polarized).

The collimating optics 32 are disposed between the substrate waveguide 40 and the image source 20. The collimating optics 32 can be a single optical component, such as a lens, or include multiple optical components. In one embodiment, the collimating optics 32 are configured as a catadioptric collimator as described with reference to FIGS. 3-7. The collimating optics 32 are integrated with or spaced apart from image source 20 and/or substrate waveguide 40 in some embodiments.

In operation, the HUD system 10 provides images from the image source 20 via the collimating optics 32 to a pilot or other operator so that the pilot or other operator simultaneously views the images and a real world scene in some embodiments. The images can include graphic and/or text information (e.g., flight path vector, etc.) related to avionic information in some embodiments. In addition, the images can include synthetic or enhanced vision images. In some embodiments, collimated light representing the image from the image source 20 is provided on the substrate waveguide 40 so that the pilot can view the image conformally on the real world scene through the substrate waveguide 40. The substrate waveguide 40 is a translucent or transparent combiner for viewing the real world scene through main surfaces or sides 84 and 88 in some embodiments.

Figure 2:
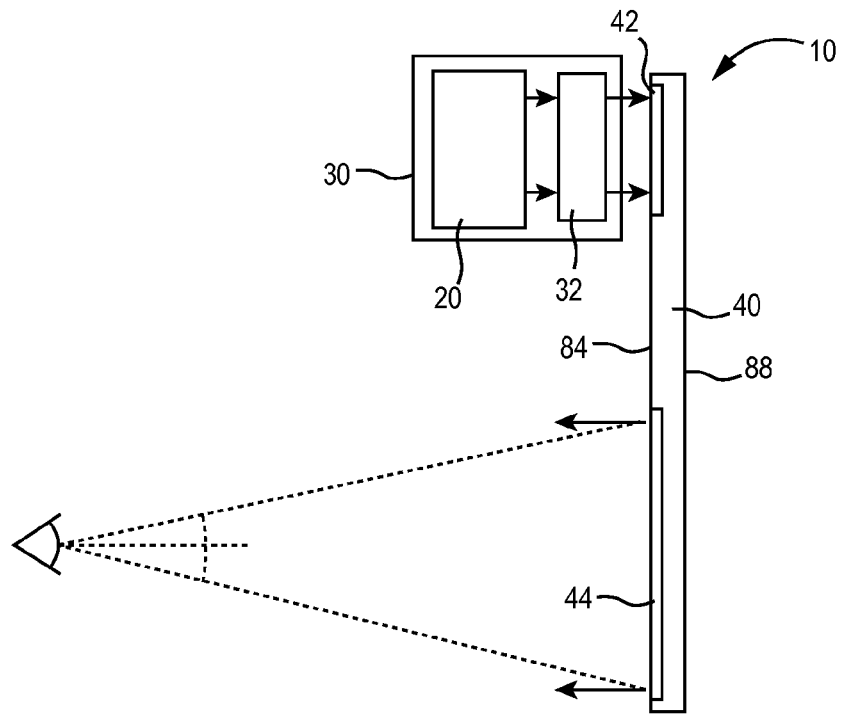
FIG. 2 is a general block diagram of a HUD system in accordance with some exemplary embodiments of the inventive concepts disclosed herein.

With reference to FIG. 1, the input coupler 42 and the output coupler 44 are disposed on respective opposing sides 84 and 88 of substrate waveguide 40 in some embodiments. With reference to FIG. 2, the input coupler 42 and the output coupler 44 can also be formed on the same side 84 of the substrate waveguide 40 in some embodiments.

Figure 3:
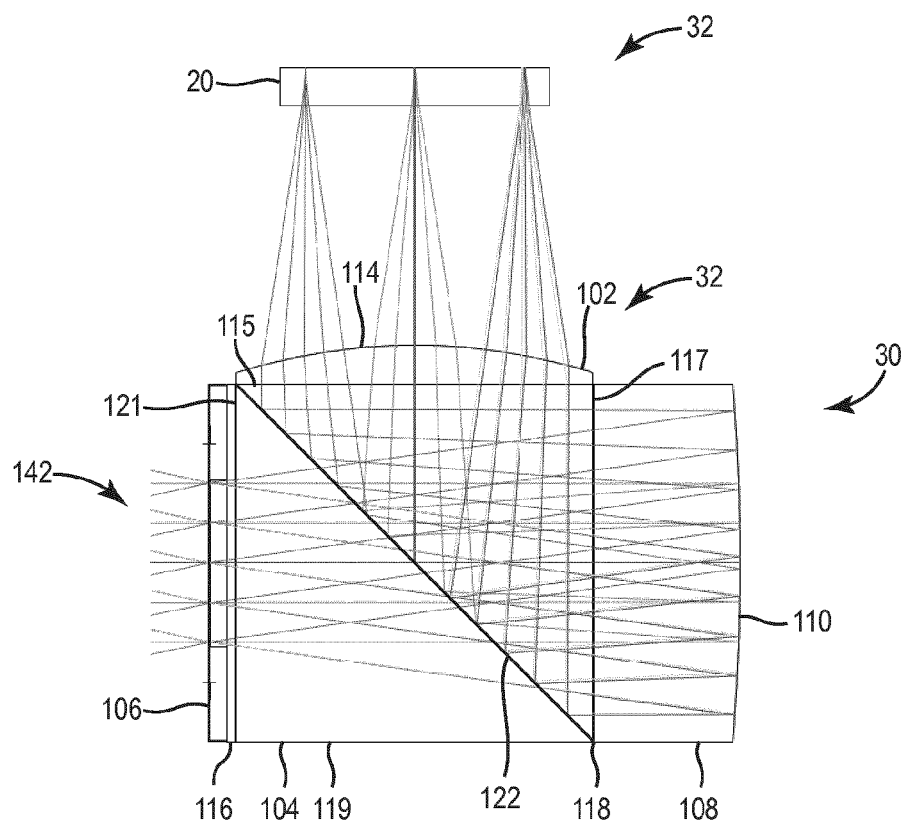
FIG. 3 is a side view schematic drawing of collimating optics for the HUD systems illustrated in FIGS. 1 and 2 in accordance with some exemplary embodiments of the inventive concepts disclosed herein.
Figure 4:
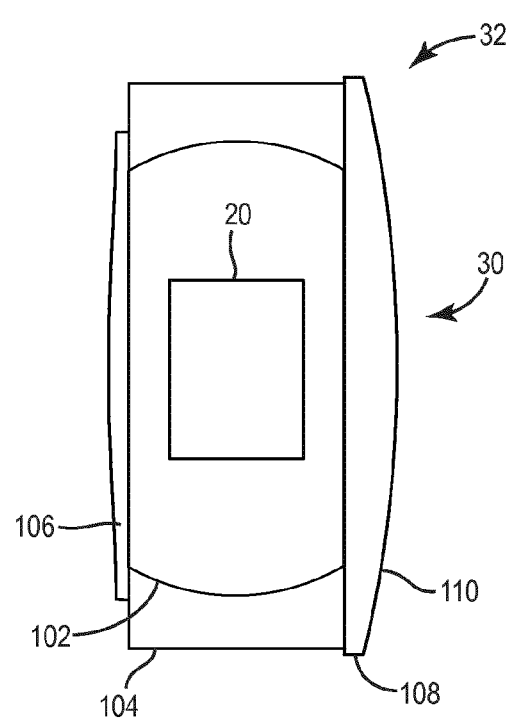
FIG. 4 is a top view schematic drawing of the collimating optics illustrated in FIG. 3.

With reference to FIGS. 3 and 4, the projector 30 includes an assembly of the collimating optics 32 disposed adjacent to or in the proximity of the image source 20 in some embodiments. In some embodiments, the collimating optics 32 provide a catadioptric collimator system and include a field lens 102, a beam splitter 104, a curved mirror 108, a corrector lens 106, a polarizer 116, and a film 118. The corrector lens 106 is disposed to provide collimated light to the input coupler 42 (FIG. 1) in some embodiments. The field lens 102 receives polarized light (e.g., an image) from the image source 20.

The beam splitter 104 is a polarizing beam splitter in a prismatic form in some embodiments. The beam splitter 104 includes a face 115, a face 117, a face 119, a face 121, and a polarization selective reflective surface 122 in some embodiments. The field lens 102 is disposed on the face 117, and the curved mirror 108 is provided on the face 119 (or is provided on the film 118 which is provided on the face 119) in some embodiments. The beam splitter 104 provides an internal folded optical path and includes the polarizer 116 provided on the face 121 in some embodiments.

The film 118 is a quarter wave retarder film in some embodiments. The film 118 controls the polarization states for efficient light transmission through the polarization selective reflective surface 122 of the beam splitter 104 in some embodiments. The polarizer 116 cleans up stray light in some embodiments.

The beam splitter 104 is a rectangular prism in single axis pupil expansion implementations of the HUD system 10 with an elongated sides extending into and out of the page in FIG. 3.

The field lens 102 includes a diffractive surface 114 and is configured as a plano-convex aspherical lens in some embodiments. The diffractive surface 114 is an aspheric surface processed by diamond grinding, etching, lithography, molding or other process to form diffractive grooves in some embodiments. The diffractive surface 114 provides color correction and higher order aberration control for the collimating optics 32 in some embodiments. The field lens 102 is manufactured from optical glass or plastic material in some embodiments.

The curved mirror 108 includes a curved reflective surface 110. The curved reflective surface 110 is a dichroic surface, a silvered, a metallic, or other reflecting surface and is curved to assist the collimation of light through the collimating optics 32. The curved mirror 108 provides an aspheric medium for reflective surface 110 and is manufactured from optical glass or plastic material in some embodiments. The combination of the field lens 102, the curved mirror 108, the beam splitter 104 and the corrector lens 106 serve to collimate light in some embodiments.

The corrector lens 106 is provided on the face 121 or on the polarizer 116 in some embodiments. The corrector lens 106 is manufactured from optical glass or plastic material in some embodiments. A retarder plate (e.g., similar to film 118) can be provided before or after the field lens 102 to effect a polarization change in some embodiments.

The light received at the face 115 of the beam splitter 104 from the image source 20 is reflected off the polarization selective reflective surface 122 within the beam splitter 104 to the face 117. Light travels from the face 117 through the film 118 to the curved mirror 108. The curved mirror 108 provides a catoptric element which in conjunction with a refractive (dioptric) element, such as, corrector lens 106, provides a catadioptric system in some embodiments. Reflective surface 110 can be modeled as an aspheric lens in some embodiments.

Light reflecting from the curved reflective surface 110 is provided through the film 118, the polarization selective reflective surface 122, and the polarizer 116 to the face 115. A combination of elements in the collimating optics 32 collimates light at an exit pupil 142 associated with the face 121 or the corrector lens 106. Applicants believe that the collimating optics 32 embodied as a catadioptric system advantageously assists in making the design of the HUD system 10 nearly 10 times smaller in volume than conventional designs in one embodiment. The assembly in some embodiments has a volume of less than 1 cubic centimeter.

The elements of the collimating optics 32 can be cemented together around beam splitter 104 to form a small, compact package. Mounting the field lens 102 and the curved mirror 108 directly to the beam splitter 104 or the film 118 provided on the beam splitter 104 provides mechanical alignment in very tight tolerances. Advantageously, the corrector lens 106 can have dimensions identical to dimensions associated with the face 115 of the beam splitter 104 such that easy alignment is obtained. Similarly, the field lens 102 and the curved mirror 108 can match the sizes of the respective faces 115 and 117.

Figure 10:
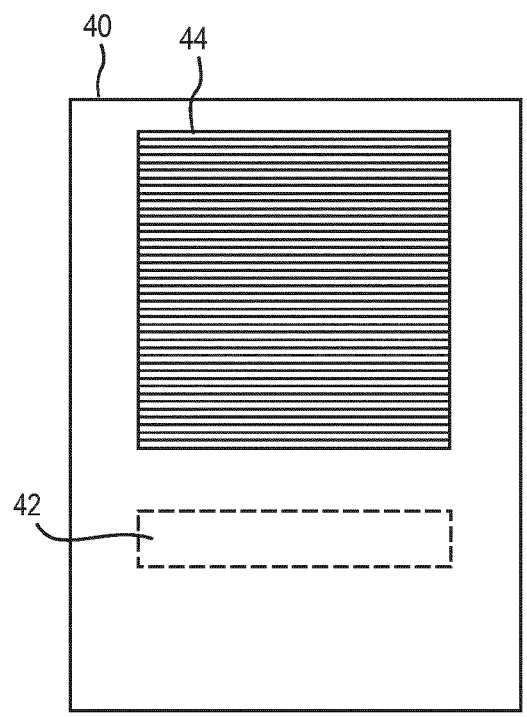
FIG. 10 is a front view schematic drawing of a waveguide for the HUD systems illustrated in FIGS. 1 and 2 in accordance with some exemplary embodiments of the inventive concepts disclosed herein.

The collimating optics 32 in FIGS. 3 and 4 are configured for use with single axis pupil expansion such as with the substrate waveguide 40 as shown in FIG. 10 in some embodiments. The collimating optics 32 discussed with reference to FIG. 3-4 can also be used in dual axis expansion implementations in some embodiments.

Figure 5:
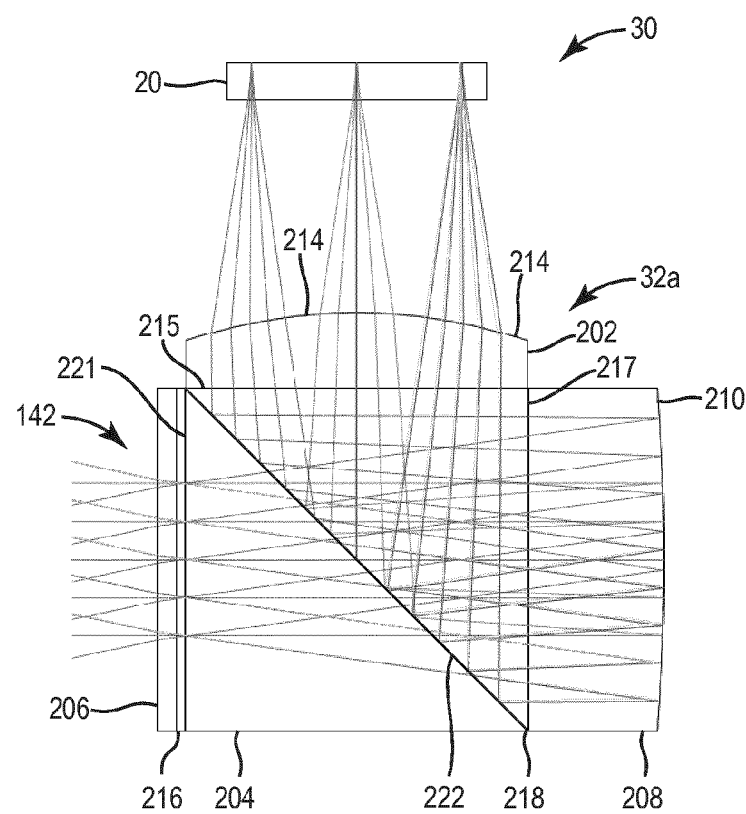
FIG. 5 is a side view schematic drawing of collimating optics for the HUD systems illustrated in FIGS. 1 and 2 in accordance with some exemplary embodiments of the inventive concepts disclosed herein.
Figure 6:
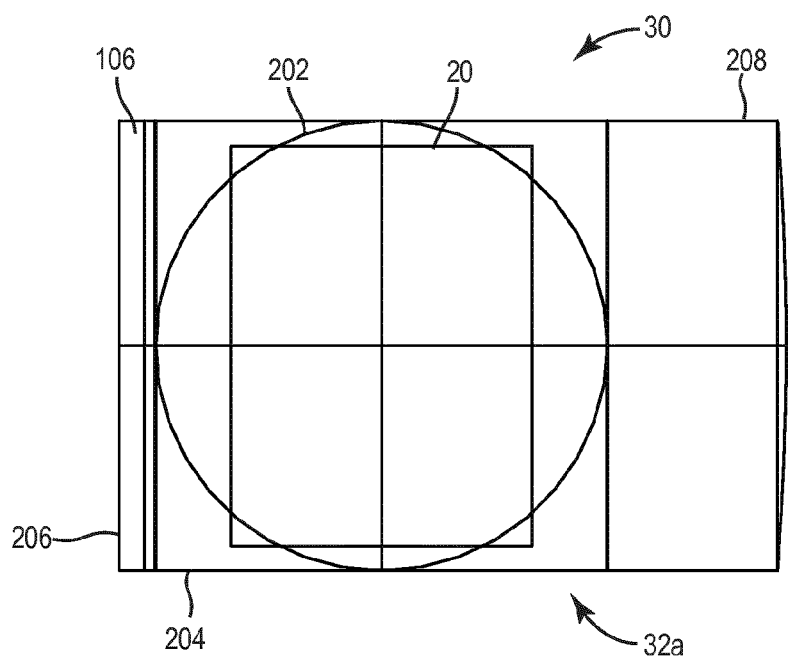
FIG. 6 is a top view schematic drawing of the collimating optics illustrated in FIG. 5.

With reference to FIGS. 5 and 6, the collimating optics 32a are similar to the collimating optics 32 discussed with reference to FIGS. 3 and 4. The collimating optics 32a include a field lens 202, a curved mirror 208, polarizing beam splitter 204 and a corrector lens 206. The corrector lens 206 is optional in some embodiments. The polarizing beam splitter 204 includes a polarization selective reflective surface 222 similar to a polarization selective reflective surface 122 (FIGS. 3 and 4). A film 218 is provided between the curved mirror 208 and the polarizing beam splitter 204 and is similar to the film 118.

Figure 11:
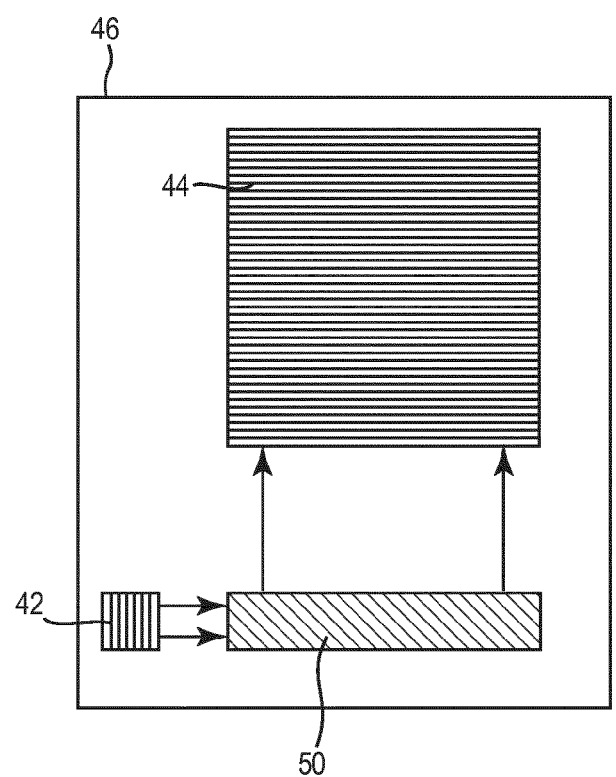
FIG. 11 is a front view schematic drawing of a waveguide for the HUD systems illustrated in FIGS. 1 and 2 in accordance with some exemplary embodiments of the inventive concepts disclosed herein.

The collimating optics 32a illustrated in FIGS. 5 and 6 are suitable for dual axis expansion such as dual axis expansion utilizing the substrate waveguide 40 illustrated in FIG. 11. The cone angles for the field lens 202 are smaller than the cone angles for the field lens 102 and are more suitable for use of the diffractive optical surface in some embodiments.

A cleanup polarizer 216 is provided between the corrector lens 206 and the polarizing beam splitter 204 (e.g., on a face 219). The corrector lens 206 is a flat cover glass for protecting polarizer 116 or beam splitter 104 in some embodiments. In some embodiments, the corrector lens 206 is not necessary due to the power of the curved reflective surface 110 and the field lens 102 with the diffractive surface 114. The components associated with the collimating optics 32a can be cemented together similar to collimating optics 32 discussed with reference to FIG. 3-4. Mounting the field lens 202 and the curved mirror 208 directly to the polarizing beam splitter 204 or the film 218 provided on the polarizing beam splitter 204 provides mechanical alignment in very tight tolerances.

Figure 7A:
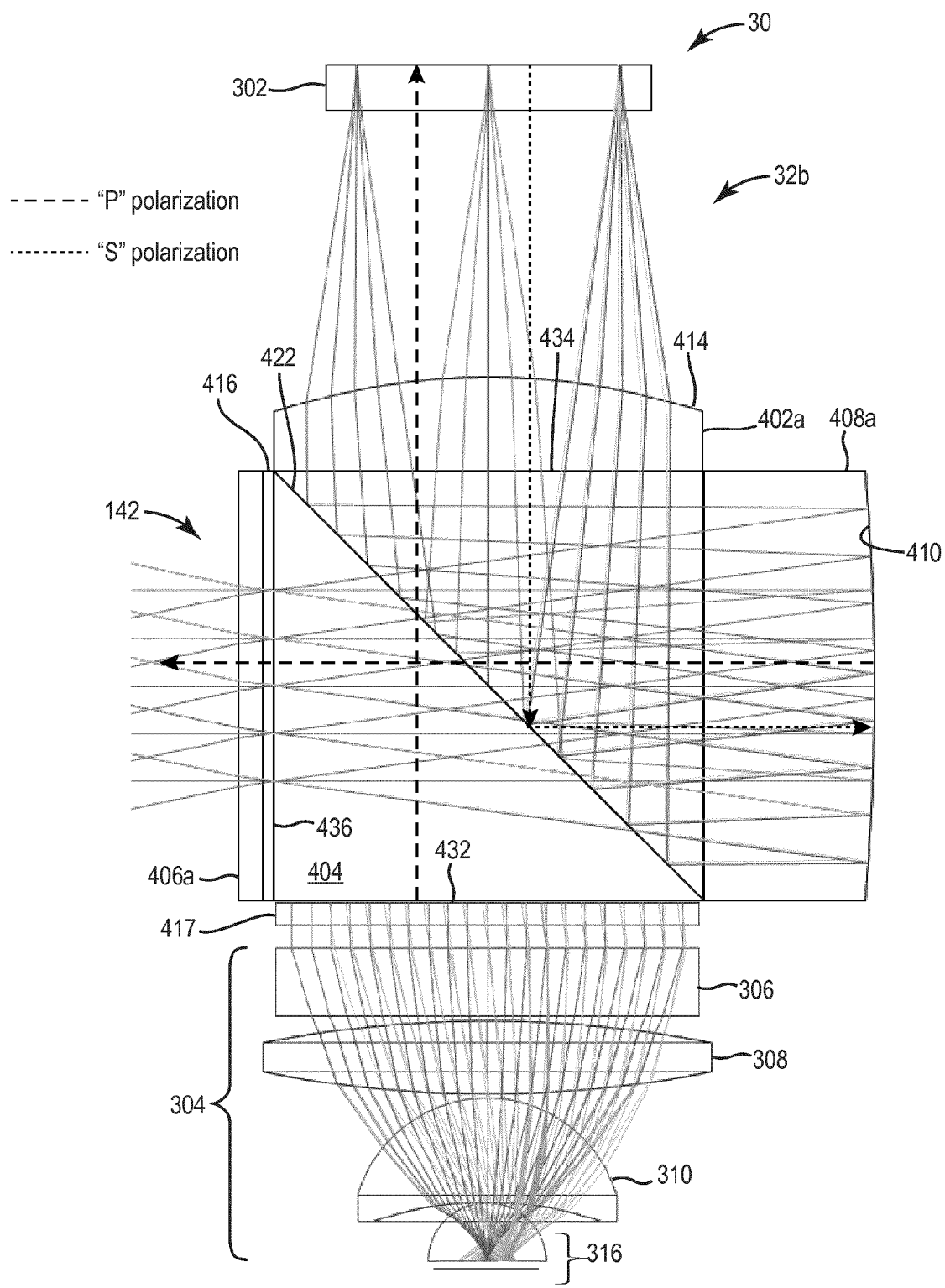
FIG. 7A is a side view schematic drawing of collimating optics for the HUD systems illustrated in FIGS. 1 and 2 in accordance with some exemplary embodiments of the inventive concepts disclosed herein.

With reference to FIG. 7A, the projector 30 includes collimating optics 32b, a LCOS display 302 and an illuminator 304 in some embodiments. The illuminator 304 includes a Fresnel lens 306, a convex lens 308, a dome lens 310, and a LED 316 in some embodiments. Light is provided from the LED 316 through the dome lens 310, the convex lens 308, and the Fresnel lens 306 to the collimating optics 32. Using the image source 20 and the illuminator 304 provides an even smaller package for the projector 30 in some embodiments.

The collimating optics 32b shown in FIG. 7A are similar to the collimating optics 32 and 32a discussed with reference to FIGS. 3-6. The collimating optics 32b include a field lens 402a (similar to the field lens 202), a beam splitter 404 (similar to the beam splitter 204), a curved mirror 408a (similar to the curved mirror 208), a corrector lens 406 (similar to the corrector lens 206), and a pre-polarizer 417. The beam splitter 404 is a polarizing beam splitter disposed between the illuminator 304 and the LCOS micro display 302 in some embodiments.

The pre-polarizer 417 is provided on a face 432 of the beam splitter 404. Light from the Fresnel lens 306 is polarized in a particular state (e.g., S or P polarized light) by the pre-polarizer 417 and provided to the LCOS micro display 302. The beam splitter 404 includes a polarization selective reflective surface 422 between the face 432 and a face 434. Polarized light of a first state is provided through the polarization selective reflective surface 422 to the LCOS micro display 302. The LCOS micro display 302 provides an image to the field lens 402a. The field lens 402a includes a diffractive surface 414 similar to the diffractive surface 214 (FIG. 3). The LCOS micro display 302 changes the polarization of the light received from the face 434 of beam splitter 404 to a second state (e.g., S or P polarized light). Light passes through the face 434 and strikes the polarization selective reflective surface 422 and is reflected toward a curved reflective surface 410 of the curved mirror 408a. As light travels through a retarder film 418, the polarization of the light is changed. As light is reflected from the curved reflective surface 410, it passes back through the retarder film 418 and becomes polarized back to the first state and passes through the polarization selective reflective surface 422. The light exits a face 436 of the beam splitter 404 and passes through the corrector lens 406 which is optional. A clean up polarizer 416 is provided between the corrector lens 406 and the beam splitter 404 at the face 436 of the beam splitter 44 in some embodiments. Collimating optics 32b is suitable for dual pupil expansion designs in some embodiments.

Figure 7B:
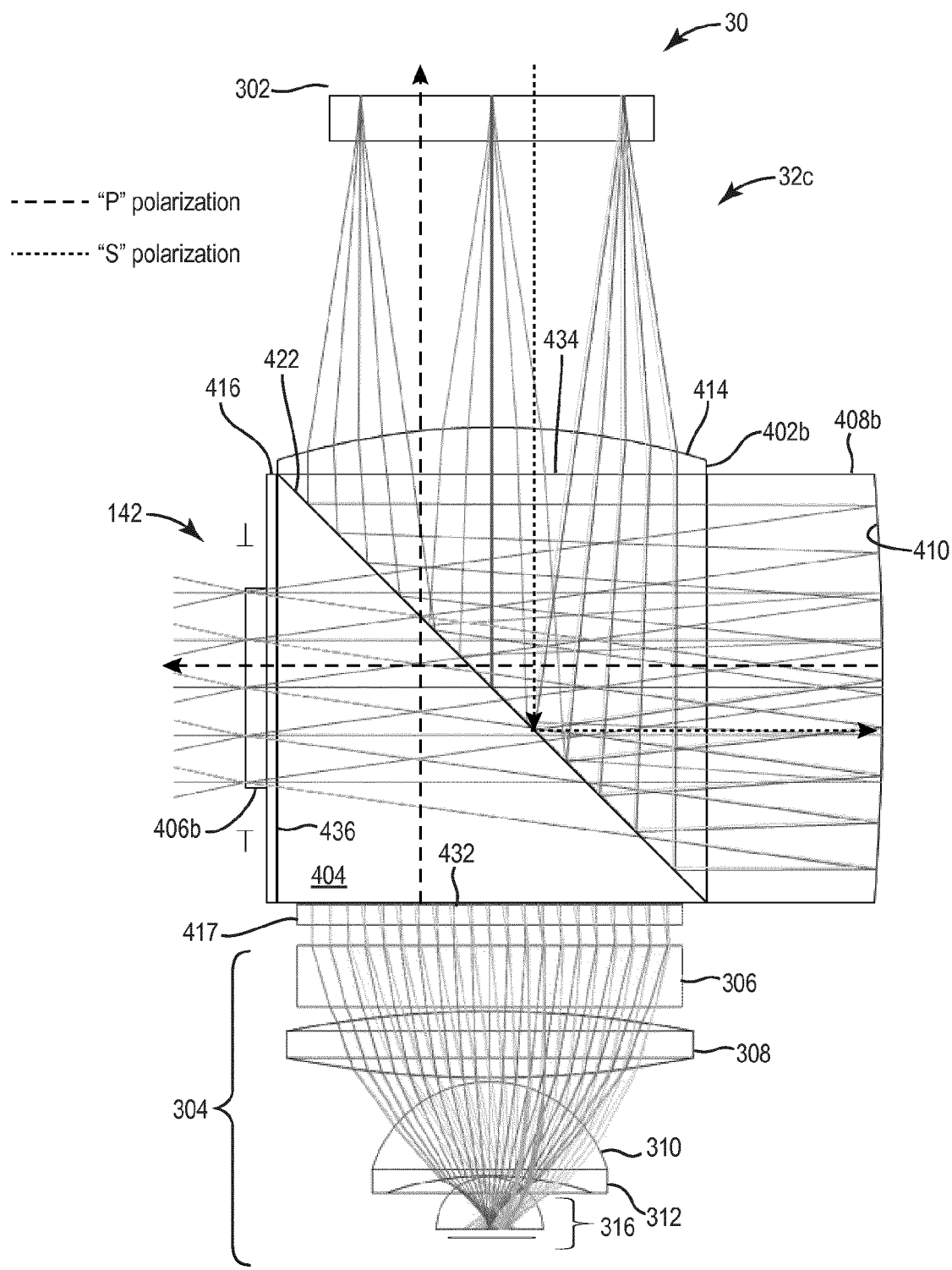
FIG. 7B is a side view schematic drawing of collimating optics for the HUD systems, illustrations in FIGS. 1 and 2 in accordance with exemplary embodiments of the inventive concepts disclosed herein.

With reference to FIG. 7B, the projector 30 includes the image source 20 and the collimating optics 32c in some embodiments. The image source 20 includes the LCOS micro display 302 and the illuminator 304.

The collimating optics 32c shown in FIG. 7B are similar to the collimating optics 32, 32a and 32b discussed with reference to FIGS. 3-7A. The collimating optics 32c include a field lens 402b (similar to the field lens 102), the beam splitter 404 (similar to the beam splitter 104), a curved mirror 408b (similar to the curved mirror 108), the corrector lens 406 (similar to the corrector lens 106), and the pre-polarizer 417. Collimating optics 32c is suitable for single axis pupil expansion designs in some embodiments.

The assembly of the collimating optics 32, 32a, 32b and 32c as embodied in FIGS. 3, 5, 7A and 7B advantageously provides a relatively low optical element count with a short focal length in some embodiments. The F ratio (the ratio of pupil diameter to focal length) is kept very low in some embodiments. In addition, the assembly of the collimating optics 32, 32a, 32b, and 32c as embodied in FIGS. 3, 5 and 7A and 7B efficiently handles polarized light and provides a compact high performance collimating solution.

As shown in FIGS. 3-7B, the collimating optics 32, 32a, 32b, and 32c uses a combination of low-ratio reflective optics in an on-axis arrangement with the beam splitters 104, 204, and 404 and the exit pupil 142 being truncated in some embodiments. The low-ratio optics provides the advantage of achieving a high optical efficiency in a small volume in some embodiments. The on-axis arrangement allows excellent aberration correction and low element count in some embodiments. The reflective optics provide low chromatic dispersion and the beam splitter 104 allows the collimating optics 32, 32a, 32b, and 32c to be used on axis (no tilted or de-centered elements) in some embodiments. Fold optical elements are advantageously not required by the collimating optics 32, 32a, 32b, and 32c which simultaneously provide both collimation and efficient handling of polarization states in some embodiments.

In some embodiments, the collimating optics 32, 32a, 32b, and 32c provide a 30 degree field of view from the image source 20 embodied as a 9.4 millimeters. diagonal LCOS display which translates into a focal length of approximately 13 millimeters. Eliminating the use of a folded prism path shortens back focal length and improves the performance while reducing size and weight in some embodiments. Fields of view in excess of 40 degrees using the collimating optics 32, 32a, 32b, and 32c having a size of less than 1 cubic centimeter are possible in some embodiments. The design of the collimating optics 32, 32a, 32b, and 32c is also compatible with OLED, AMLCD, or other micro displays.

Figure 7C:
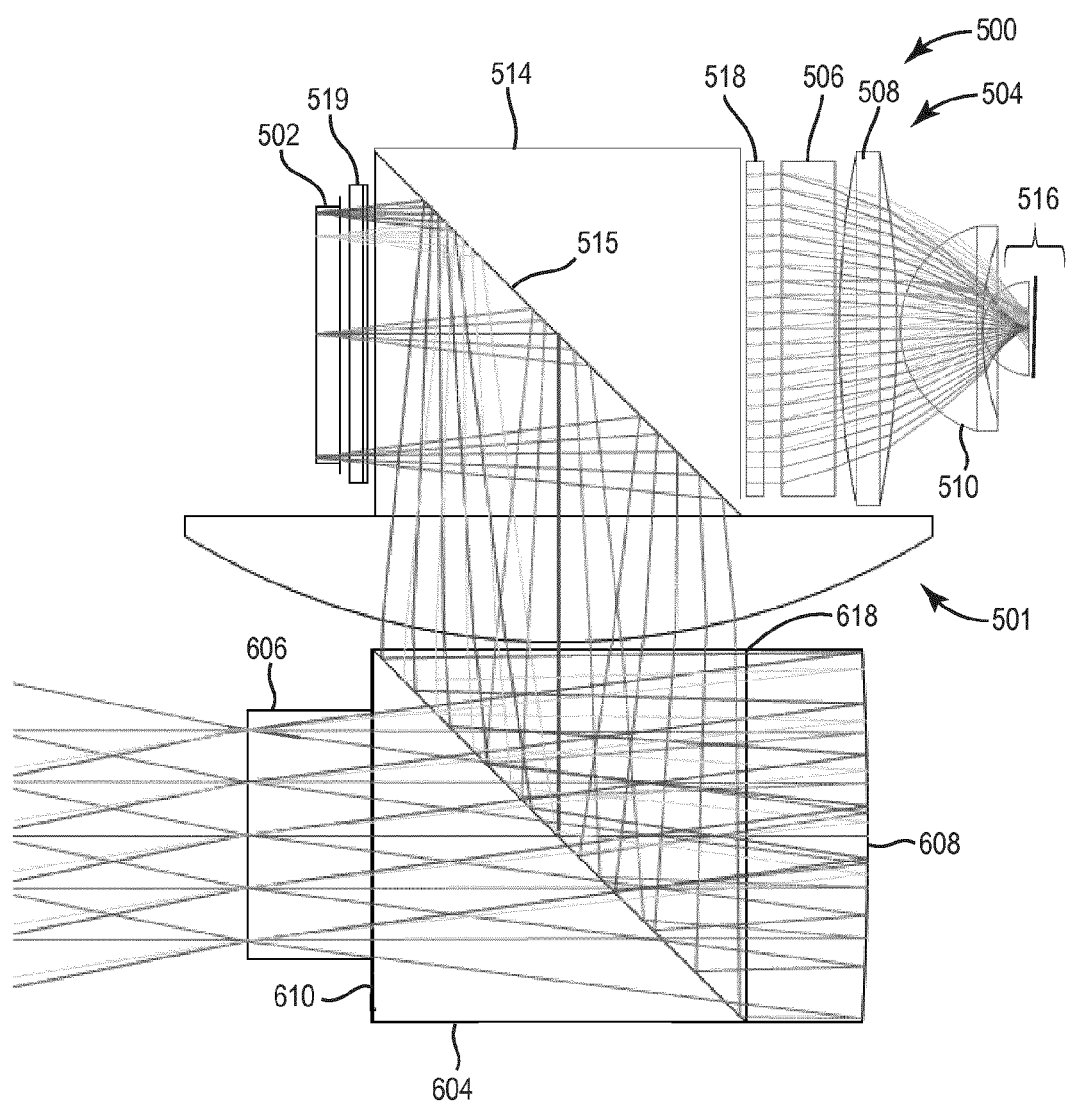
FIG. 7C is a side view schematic drawing of collimating optics including a folded path before the field lens.

With reference to FIG. 7C, a projector 500 includes collimating optics 501, a LCOS display 502, and an illuminator 504. The illuminator 504 includes a Fresnel lens 506, a convex lens 508, dome lens 510, and a LED 516. The illuminator 504 also includes a beam splitter 514 having a polarization sensitive reflective coating 515, a polarizer 518, and a retarder 519. The polarizer 518 is disposed between the lens 506 and the polarizing beam splitter 514. Light from the LED 516 is provided through, the dome lens 510, the convex lens 508, the lens 506, the polarizer 518, the polarizing beam splitter 514 including the polarization sensitive reflective coating 515, and the retarder 519 to the LCOS micro display 502.

An image reflected off the LCOS micro display 502 is provided through the retarder 519 and the light has a polarization such that the light that is reflected by polarization sensitive reflective coating 515 to the collimating optics 501. The collimating optics 501 include a field lens 602, a polarizing beam splitter 604, a curved reflective element 608, a quarter wave retarder film 618, and a correcting lens 606. A half wave retarder film 610 is provided between corrected lens 606 and polarizing beam splitter 604. The field lens 602 is generally spatially separate from the polarizing beam splitter 604 and is larger than the field lenses 102, 202, 402A, and 402B (FIGS. 3-7B).

Figure 8:
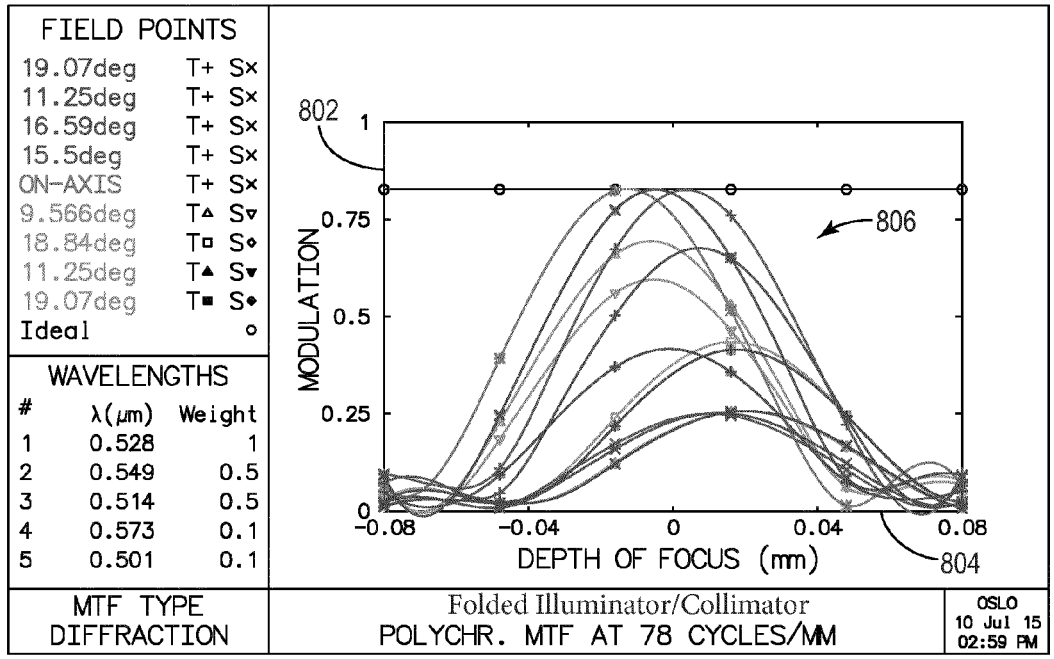
FIG. 8 is a chart showing resolution of a conventional projector.
Figure 9:
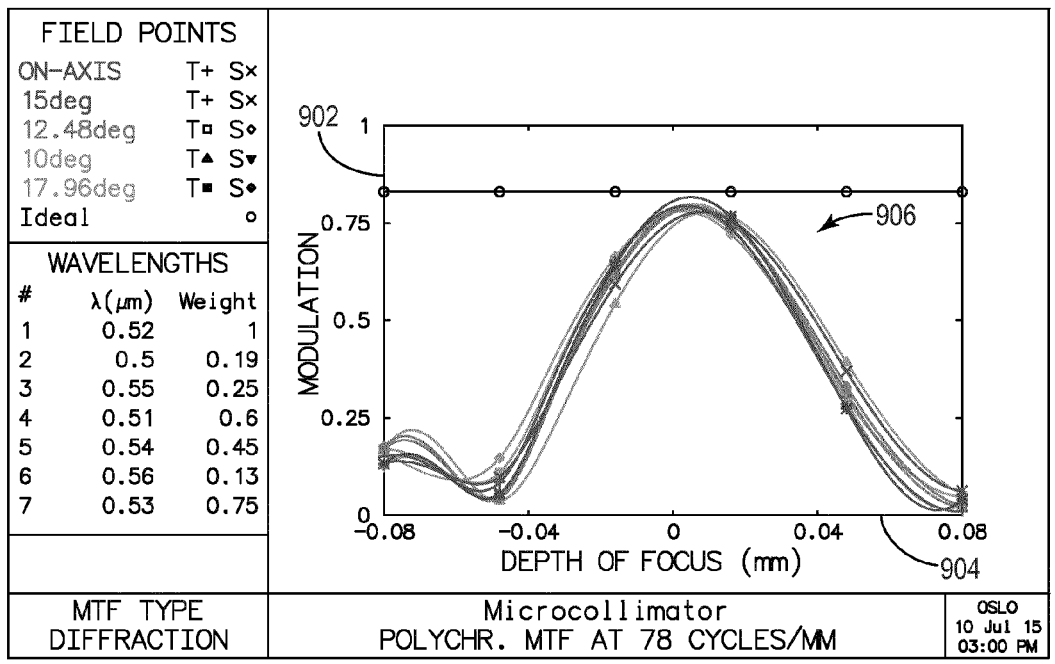
FIG. 9 is a chart showing resolution of the projector illustrated in FIG. 7 in accordance with some embodiments of the inventive concepts disclosed herein.

With reference to FIG. 8, an X axis 804 represents focus in inches and a Y axis 802 represents the modulation transfer function weighted across LED spectral weights which is an indication of contrast. A set of curves 806 at various angles demonstrates resolution for the collimating optic 501 of FIG. 7C. With reference to FIG. 9, a Y axis 902 represents the modulation transfer function weighted across LED spectral weights which is an indication of contrast and an X axis 904 represents focus in millimeters. A set of curves 906 at various angles shows better resolution for the collimating optics 32b of FIG. 7A at the same effective aperture as the collimating optics 501 of FIG. 7C. The projector 500 including fold optics (the beam splitter 514) before the field lens 602 provides a polychromic modulation transfer function of 20 cycles per millimeter while the polychromic modulation transfer function for the projector 30 including the collimating optics 32b of FIG. 7A is 78 cycles per millimeter in some embodiments.

With reference to FIGS. 1 and 10, the substrate waveguide 40 includes an input coupler (e.g., a diffraction grating) 42 and an output coupler (e.g. a diffraction grating) 44. In some embodiments, the input coupler 42 and the output coupler 44 are comprised of surface relief gratings, volume gratings (e.g. holographic gratings), reflective arrays, etc. In some embodiments, the substrate waveguide 40 of FIG. 10 effects the single axis pupil expansion.

With reference to FIG. 11, the substrate waveguide 40 is configured for dual axis pupil expansion and includes the input coupler 42, a fold grating 50, and the output coupler 44 in some embodiments. The fold grating 50 expands the pupil in a first direction (e.g., vertically) and the output coupler 44 expands the pupil in a second direction (e.g., horizontally) in some embodiments. In some embodiments, the input coupler 42, fold grating 50 and output coupler 44 are comprised of surface relief gratings, volume gratings (e.g. holographic gratings), reflective arrays, etc. In some embodiments, the input coupler 42 is a surface relief grating and the fold grating 50 and the output coupler 44 are volume holograms.

In some embodiments, two layers of waveguides are used to provide dual axis expansion utilizing cross gratings. Each layer expands in the pupil in one direction. Dual axis expansion using waveguides is discussed in U.S. Pat. No. 8,736,963, incorporated herein by reference in its entirety.

Figure 12:
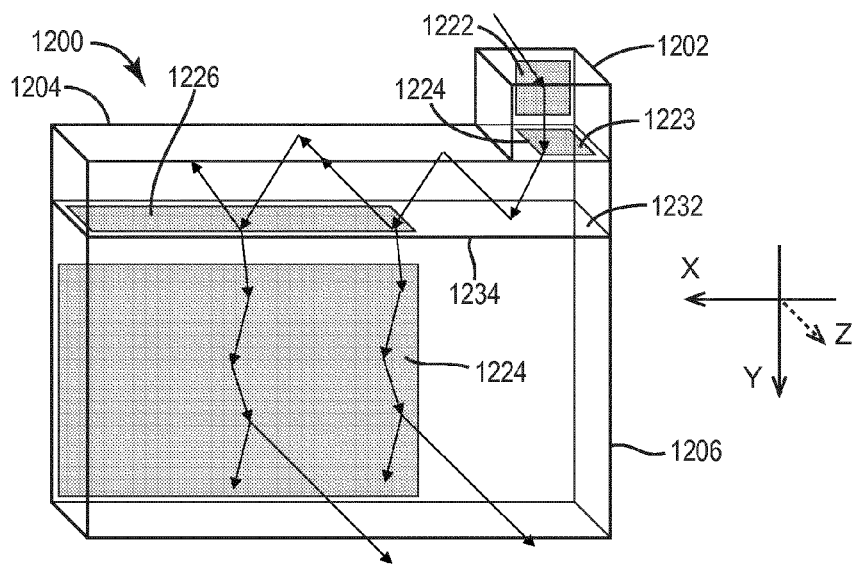
FIG. 12 is a planar front view schematic drawing of a head worn waveguide for the HUD systems illustrated in FIGS. 1 and 2 in accordance with some exemplary embodiments of the inventive concepts disclosed herein.

With reference to FIG. 12, a head worn waveguide system 1200 can be used as the substrate waveguide 40 (FIG. 1). A projector, such as the projector 30, can be used with the head worn waveguide system 1200 or the head worn waveguide systems discussed in U.S. patent application Ser. No. 14/715,332 invented by Brown et al. and filed May 18, 2015 and incorporated herein by reference in its entirety. The head worn waveguide system 1200 is similar to the waveguides discussed in U.S. patent application Ser. No. 14/715,332. The head worn waveguide system 1200 provides dual axis pupil expansion in some embodiments.

In some embodiments, the head worn waveguide system 1200 includes an input block 1202, a light pipe 1204 and a waveguide 1206. The input block 1202 includes an input coupler or input grating 1222 and a turn grating 1223 (e.g., a fold grating). The input grating 1222 is disposed on a top portion of the XY face of input block 1302 in some embodiments. The light pipe 1204 includes a turn grating 1226. In some embodiments, the turn grating 1223 is provided on the light pipe 1204 or between the light pipe 1204 and the input block 1202. The waveguide 1206 includes an output grating 1224 which is placed on an XY face (or its parallel) of the waveguide 1206 in some embodiments.

In some embodiments, the input grating 1222 couples light from the projector 30 (FIG. 1) into the input block 1202 (e.g., light provided to an XY face of the input block 1202 is turned along the Y direction with only one axis of rotation and in total internal reflection with the XY surfaces of the input block 1202). The turn grating 1223 is configured to turn the light for entry into the light pipe 1204 (e.g., cause the light to travel along the X direction only and maintaining total internal reflection on the XZ faces of the light pipe 1202). The light propagates down the light pipe 1204 by total internal reflection on the XZ faces until it reaches the turn grating 1226 on an XZ face of the light pipe 1204 where the light is turned toward the waveguide 1206 (e.g., breaks total internal reflection conditions in the XZ plane at the turn grating 1226 and propagates in the Y direction).

The turn grating 1226 is a reciprocal turn grating (e.g., kx2 with grating lines parallel to Z) to the input grating 1222 (e. g., ky1 with grating lines parallel to X) and disposed along the expansion path in some embodiments. The turn grating 1226 is a gradient turn grating in some embodiments. The turn grating 1223 is a reciprocal turn grating (e.g., kx2 with grating lines parallel to Z) to the input grating 1222 (e. g., ky1 with grating lines parallel to X) in some embodiments.

The light is expanded down the waveguide 1206 and is extracted along the XZ face by the output grating 1224 in some embodiments. The output grating 1224 is a reciprocal grating (e. g., ky1 with grating lines parallel to X) to the turn grating 1226 and diffracts light out of the waveguide 1206 with no dispersion in some embodiments. The light pipe 1204 provides pupil expansion in the horizontal direction and the output grating 1224 provides pupil expansion in the vertical direction (the axes of expansion are at 90 a degree angle in some embodiments).

The input grating 1222, the turn grating 1223, the turn grating 1224, and the output grating 1226 can be placed on or within the local planes of the light pipe 1204 and the waveguide 1206. In some embodiments, there is an air gap or low index of refraction material between the light pipe 1204 and the waveguide 1206. The input grating 1222, the fold grating 1224, and the output grating 1226 can be any type of light couplers including but not limited to volume holograms, switchable Bragg gratings, replicated gratings or surface relief gratings. The input grating 1222 is a reflection type grating in some embodiments. In some embodiments, the input grating 1222 is a transmission type grating. In some embodiments, the light pipe 1204 injects light into waveguide 1206 along a top edge 1232 of the waveguide 1206 via a bottom edge 1234 of the light pipe 1204. Any of the gratings 1222, 1224, and 1226 can be replaced with a properly designed mirror or mirror arrays. The dispersion compensation can be lost depending on specific arrangement.

The light pipe discussed in U.S. patent application Ser. No. 14/715,332 does not necessarily provide pupil expansion in the waveguide (e.g., along the second direction) at an angle of 90 degrees with respect to the first direction of pupil expansion which can lead to a vignetted view in the monocular eye box in some embodiments. The pupil expansion technique discussed in U.S. patent application Ser. No. 14/715,332 does not address dispersion compensation because light is being expanded along two axes but only dispersed along one axis in some embodiments. This produces a banding structure in the eye box of the display, similar to a narrow band source single axis expansion, such as using laser illumination, in some embodiments. The head worn waveguide system 1200 achieves close to a 90 degree angle between the two directions of pupil expansion therefore providing a compact and high efficiency system with large unvignetted eye box with dispersion compensation.

In some embodiments, a gradient beam splitter and a high efficiency turn grating is provided in a plane parallel to the XZ plan and in the light pipe 1204 instead of the turn grating 1226. In some embodiments, an input port is provided on the light pipe 1204 instead of the input block 1202. The input port is an input grating on the XZ surface of the light pipe 1204 and works in reflection mode in some embodiments. The input port is a kinoform mirror or a mirror array (without dispersion property) in some embodiments. In some embodiments, the turning grating 1226 is replaced by a mirror array in parallel or mirrored orientation. The mirrors are partial reflectors with angular dependent coating to avoid ghost reflections from the un-intended group in some embodiments. In some embodiments, the mirror array for the input is removed and the input grating is rotated in-plane to send the spiral ray down the light pipe 1204. In some embodiments, for dispersion compensation, the gratings at the input of the light pipe 1204 and at the output in the waveguide 1206 are matched in pitch and mirrored by the turning mirror array. In some embodiments, the turning grating/mirrors is made gradient to allow controlled light output from the light pipe 1204 into the waveguide 1206.

Figure 13:
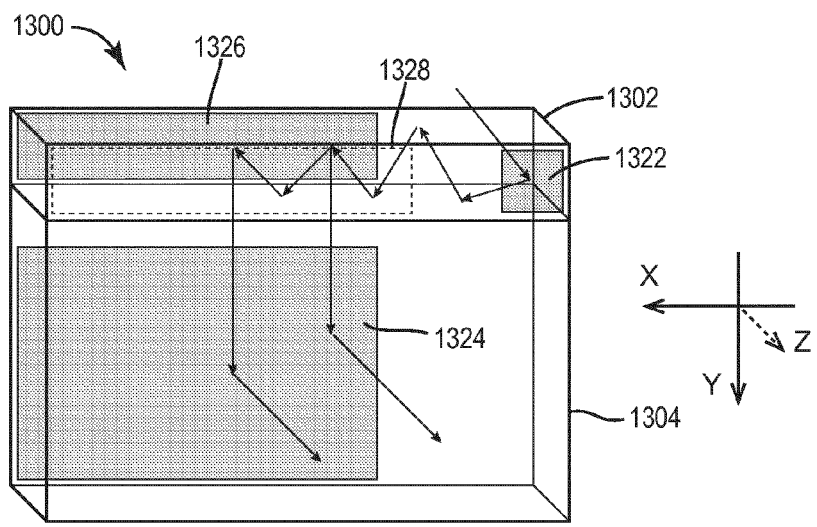
FIG. 13 is a perspective view schematic drawing of a head worn waveguide for the HUD systems illustrated in FIGS. 1 and 2 in accordance with some exemplary embodiments of the inventive concepts disclosed herein.

With reference to FIG. 13, a head worn waveguide system 1300 can be used as the substrate waveguide 40 (FIG. 1). A projector, such as the projector 30, can be used with the head worn waveguide system 1300. The head worn waveguide system 1300 is similar to the head worn waveguide 1200 (FIG. 12) and provides dual axis pupil expansion in some embodiments.

In some embodiments, the head worn waveguide system 1300 includes a light pipe 1304 and a waveguide 1306. The light pipe 1304 includes an input coupler or input grating 1322, and a pair of mirror symmetric turn gratings 1326 and 1328 (e.g., on XY faces (or their parallel) of the light pipe 1304). In some embodiments, only one of the mirror symmetric turn gratings 1326 and 1328 is utilized. The input grating 1322 is on the XY face of the light pipe 1302 in some embodiments. The waveguide 1306 includes an output grating 1424 which is disposed on an XY face (or its parallel) of the waveguide 1306 in some embodiments.

In some embodiments, the input grating 1322 has both x and y k-vector orientation. The turn gratings 1326 and 1328 have both components, such that the rotation angle of the k-vector will diffract the ray along the local Y direction. The turn gratings 1326 and 1328 can be used to pick up the mirror-symmetric ray if desired. The output grating 1324 has a k-vector that is oriented so that the sum rotation angle is zero in some embodiments.

In some embodiments, the input and output gratings 1322 and 1324 are on either side of the light pipe 1302 and the waveguide 1306 in the XY plane. In some embodiments, the turning gratings 1326 and 1328 can be on any of the four surfaces of the light pipe 1404 (e.g., in both the XY and XZ planes. The gratings 1322, 1324, 1326, and 1328 are either surface mounted or imbedded in some embodiments.

Figure 14:
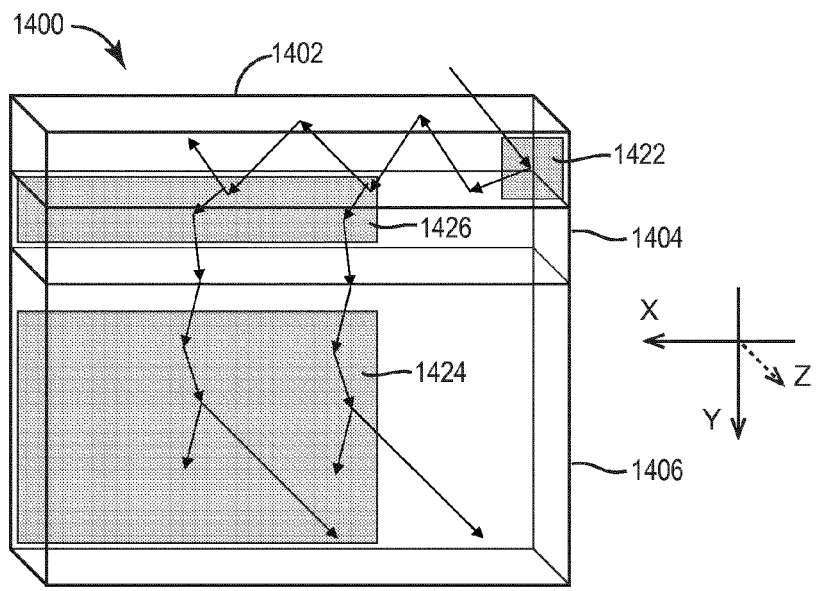
FIG. 14 is a perspective view schematic drawing of a head worn waveguide for the HUD systems illustrated in FIGS. 1 and 2 in accordance with some exemplary embodiments of the inventive concepts disclosed herein.

With reference to FIG. 14, a head worn waveguide system 1400 can be used as the substrate waveguide 40 (FIG. 1). A projector, such as the projector 30, can be used with the head worn waveguide system 1500. The head worn waveguide system 1400 is similar to the head worn waveguide 1200 (FIG. 12) and provides dual axis pupil expansion in some embodiments.

In some embodiments, the head worn waveguide system 1400 includes a light pipe 1402, a light pipe 1404 and a waveguide 1406. The light pipe 1402 includes an input coupler or input grating 1422, and the light pipe 1404 includes a turning grating 1426 (e.g., on an XY face (or its parallel) of the light pipe 1404). The input grating 1422 is on the XY face of the light pipe 1502 in some embodiments. The waveguide 1406 includes an output grating 1424 which is placed on an XY face (or its parallel) of the waveguide 1406 in some embodiments.

A gradient reflection coating is provided at an interface of the light pipes 1402 and 1404 in some embodiments. In some embodiments, the turn grating 1426 is one or two highly efficient mirror symmetric gratings on one or two of the XY faces of the light pipe 1404 that diffract and turn the light to break total internal reflection on the XZ face of the light pipe 1404.

In some embodiments, the input and output gratings 1422 and 1424 are on either side of the light pipe 1404 and the waveguide 1406 in the XY plane. In some embodiments, the turning gratings 1426 and 1428 can be on any of the four surfaces of the light pipe 1404 (e.g., in both the XY and XZ planes). The gratings 1422, 1424, 1426, and 1428 are either surface mounted or imbedded in some embodiments.

It is understood that while the detailed drawings, specific examples, material types, thicknesses, dimensions, and particular values given provide a preferred exemplary embodiment of the present invention, the preferred exemplary embodiment is for the purpose of illustration only. The method and apparatus of the invention is not limited to the precise details and conditions disclosed. For example, although specific types of optical component, shapes, dimensions and angles are mentioned, other components, dimensions and angles can be utilized. Various changes may be made to the details disclosed without departing from the spirit of the invention which is defined by the following claim.

What is claimed is:

1. A head up display, comprising:
   an image source;
   an illuminator;
   a field lens arranged to receive light directly from the image source;
   a polarizing beam splitter having a first face, a second face, a third face, and a fourth face, wherein the illuminator is arranged to illuminate the image source through the polarizing beam splitter through the fourth face and the first face, wherein the light from the illuminator entering the fourth face has a second polarization state, the field lens being disposed to provide the light from the image source to the first face, the polarizing beam splitter being configured to reflect light of a first polarization state through the second face, wherein the light from the image source has the first polarization state, wherein the first polarization state and the second polarization state are not the same;
   a retarder disposed to receive the light provided through the second face; and
   a curved reflector disposed to receive light from the retarder and to provide the light from the retarder back through the retarder to the second face, wherein light entering the second face has a second polarization state and wherein the polarizing beam splitter is configured so that the light entering the second face travels from the second face to the third face, wherein the light at the third face is provided for display on the head up display.

2. The head up display of claim 1, further comprising:
   a corrector lens disposed to receive light exiting the third face, wherein light leaving the corrector lens is collimated light and wherein the field lens has a diffractive surface for providing color correction and having a higher order of aberration control.

3. The head up display of claim 2, further comprising a waveguide combiner configured to provide vertical pupil expansion, horizontal pupil expansion, or both.

4. The head up display of claim 3, wherein the corrector lens, the field lens, the curved reflector, and the polarizing beam splitter are provided in a package with a volume of less than 1 cubic centimeter.

5. The head up display of claim 3, further comprising a polarizer disposed between the corrector lens and the third face.

6. The head up display of claim 1, wherein the polarizing beam splitter is cubic and the curved reflector and the retarder are attached to the polarizing beam splitter.

7. The head up display of claim 1, further comprising an LED.

8. The head up display of claim 7, further comprising a LCOS micro display.

9. The head up display of claim 1 further comprising:
   a combiner; and
   the field lens, the polarizing beam splitter and the curved reflector are part of a catadioptric optical system.

10. A method of providing information to a pilot, the method comprising:
    providing light from a light source through a polarizing beam splitter to an image source through a field lens to the polarizing beam splitter, the field lens being attached to a face of the polarizing beam splitter;
    providing light from the image source to the polarizing beam splitter and reflecting the light from the image source within the polarizing beam splitter to a curved reflective surface;
    providing light from the curved reflective surface through the polarizing beam splitter to a corrector lens; and
    providing light from the corrector lens as collimated light to a wave guide combiner.

11. The method of claim 10, wherein the field lens includes a diffractive surface.

12. The method of claim 10, further comprising: diffracting light into the wave guide.

13. The method of claim 12, further comprising: diffracting light out of the wave guide.

14. The method of claim 11, wherein the polarizing beam splitter includes two retarder films.

15. A head up display system, comprising:
    an image source;
    an illuminator;
    a field lens arranged to receive light directly from the image source;
    a polarizing beam splitter having a first face, a second face, a third face, and a fourth face, wherein the illuminator is arranged to illuminate the image source through the polarizing beam splitter through the fourth face and the first face, wherein the light from the illuminator entering the fourth face has a second polarization state, the field lens being disposed to provide the light from the image source to the first face, the polarizing beam splitter being configured to reflect light of a first polarization state through the second face, wherein the light from the image source has the first polarization state, wherein the first polarization state and the second polarization state are not the same;
    a retarder disposed to receive the light provided through the second face;
    a curved reflector disposed to receive light from the retarder and to provide the light from the retarder back through the retarder to the second face, wherein light entering the second face has a second polarization state and wherein the polarizing beam splitter is configured so that the light entering the second face travels from the second face to the third face, wherein the light at the third face is provided for display on the head up display;

at least one light pipe; and a waveguide combiner, the at least one light pipe comprises at least one turning grating or mirror array for providing light into the waveguide combiner from the light pipe.

16. The head up display system of claim 15, wherein:

the polarizing beam splitter;

the illuminator; and;

an image source, wherein the image source, the illuminator and the polarizing beam splitter are part of a catadioptric collimator.

17. The head up display system of claim 16, further comprising a corrector lens or a protective cover.

18. The head up display system of claim 16, wherein the catadioptric collimator is arranged as an on axis arrangement.

19. The head up display system of claim 16, wherein an exit pupil for the catadioptric collimator is at least three inches wide.

20. The head up display system of claim 15, wherein the turning grating is a reciprocal grating to an input grating provided on the light pipe or on an input block attached to the light pipe.

* * * * *